US011113347B2

(12) United States Patent
Zheng

(10) Patent No.: US 11,113,347 B2
(45) Date of Patent: Sep. 7, 2021

(54) METHOD AND SYSTEM FOR PROVIDING ORGANIZED CONTENT

(71) Applicants:BEIJING PARTICLE INFORMATION TECHNOLOGY CO., LTD., Beijing (CN); PARTICLE MEDIA, INC., Santa Clara, CA (US)

(72) Inventor: Zhaohui Zheng, Mountain View, CA (US)

(73) Assignees: BEIJING PARTICLE INFORMATION TECHNOLOGY CO., LTD., Beijing (CN); PARTICLE MEDIA, INC., Santa Clara, CA (US)

( * ) Notice: Subject to any disclaimer, the term of this patent is extended or adjusted under 35 U.S.C. 154(b) by 485 days.

(21) Appl. No.: 15/758,423

(22) PCT Filed: Sep. 9, 2015

(86) PCT No.: PCT/CN2015/089288
§ 371 (c)(1),
(2) Date: Mar. 8, 2018

(87) PCT Pub. No.: WO2017/041255
PCT Pub. Date: Mar. 16, 2017

(65) Prior Publication Data
US 2018/0246975 A1      Aug. 30, 2018

(51) Int. Cl.
*G06F 16/00*       (2019.01)
*G06F 16/9535*   (2019.01)
(Continued)

(52) U.S. Cl.
CPC ........ *G06F 16/9535* (2019.01); *G06F 16/958* (2019.01); *H04L 67/22* (2013.01); *G06Q 50/01* (2013.01)

(58) Field of Classification Search
CPC .................................................. G06F 16/9535
See application file for complete search history.

(56) References Cited

U.S. PATENT DOCUMENTS

| 2014/0089777 A1 | 3/2014 | Roiniotis et al. |
| 2014/0215349 A1 | 7/2014 | Kosslyn et al. |
| (Continued) | | |

FOREIGN PATENT DOCUMENTS

| CN | 101621791 A | 1/2010 |
| CN | 101882162 A | 11/2010 |
| WO | 2014043849 A1 | 3/2014 |

OTHER PUBLICATIONS

International Search Report and Written Opinion dated Jun. 12, 2016 in International Application No. PCT/CN2015/089288.
(Continued)

*Primary Examiner* — Ajith Jacob
(74) *Attorney, Agent, or Firm* — Venable LLP

(57) ABSTRACT

The present teaching relates to providing content to a user. Information related to a user is obtained. One or more channels are determined for the user from a plurality of channels based on the information, wherein each of the plurality of channels includes one or more online content items. A personal interest space is established associated with the user based on the information related to the user and the one or more channels. Content is provided in the one or more channels to the user based on information related to the personal interest space.

28 Claims, 23 Drawing Sheets

(51) Int. Cl.
*G06F 16/958* (2019.01)
*H04L 29/08* (2006.01)
*G06Q 50/00* (2012.01)

(56) References Cited

U.S. PATENT DOCUMENTS

| | | |
|---|---|---|
| 2014/0325567 A1 | 10/2014 | Mangat et al. |
| 2015/0019575 A1 | 1/2015 | Dayon et al. |
| 2015/0213136 A1 | 7/2015 | Tan et al. |
| 2015/0234844 A1 | 8/2015 | Cardonha et al. |
| 2015/0248494 A1* | 9/2015 | Mital ................ G06F 16/90328 707/722 |
| 2016/0019298 A1* | 1/2016 | Brodie ................ G06F 16/148 707/734 |

OTHER PUBLICATIONS

Extended European Search Report dated Feb. 14, 2019 in European Application 15903362.0.
Office Action dated Sep. 23, 2020 in European Application 15903362.0.

* cited by examiner

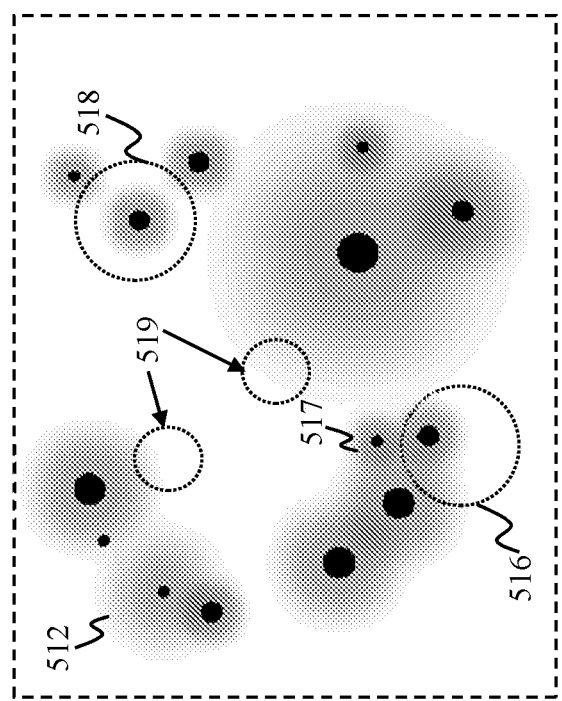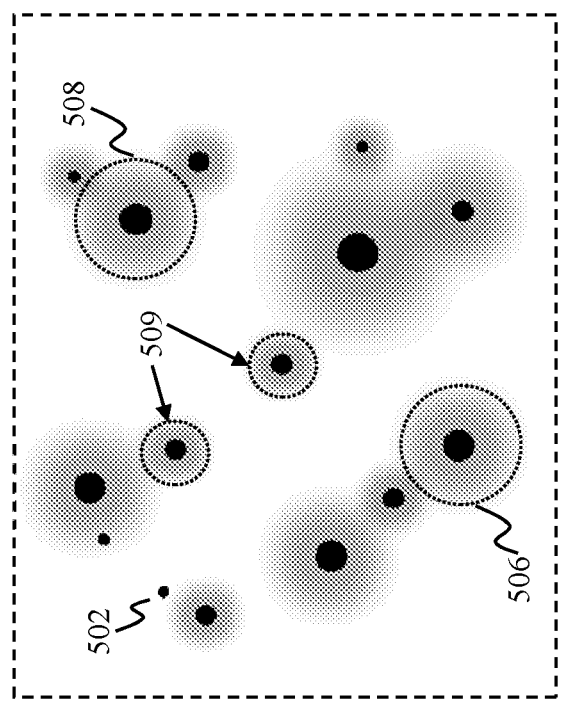
FIG. 5

Table 1910:

| Channel | Dynamic Content | Correlation with Other Channels | Subscribed Users | Assigned Advertiser | Others |
|---|---|---|---|---|---|
| C1 | DC1a, DC1b, ... | Cor12, Cor13, ... | U1, U2, U5, ... | Apple Inc. | ... |
| C2 | DC2a, DC2b, ... | Cor21, Cor23, ... | U2, U3, U4, U6, ... | None | ... |
| C3 | DC3a, DC3b, ... | Cor31, Cor32, ... | U5, U10, ... | Microsoft Corporation | ... |
| C4 | DC4a, DC4b, ... | Cor41, Cor42, ... | U5, U10, ... | None | ... |
| ... | | | ... | | ... |
| Cn | DCna, DCnb, ... | Corn1, Corn2, ... | U7, U8, U9, ... | None | ... |

1912

Table 1920:

| User ID | Interest Space ID | Associated Channels | Channel Weights | Connected User IDs | Shared Channels | Others |
|---|---|---|---|---|---|---|
| U1 | IS1 | C1, C2, C3, C6 | 20%, 30%, 40%, 10% | U2, U4 | C1, C2 | ... |
| U2 | IS2 | C2, C3, C5 | 50%, 25%, 25% | U1, U3 | C3, C5 | ... |
| U3 | IS3 | C4 | 100% | U2 | None | ... |
| U4 | IS4 | C7, C8, C10 | 80%, 10%, 10% | U1 | C7, C8, C10 | ... |
| ... | | | ... | | | ... |
| Un | ISn | C5, C6 | 60%, 40% | U5 | C6 | ... |

METHOD AND SYSTEM FOR PROVIDING ORGANIZED CONTENT

CROSS REFERENCE TO RELATED APPLICATION

This application is a national stage application, filed under 35 U.S.C. § 371, of International Application No. PCT/CN2015/089288, filed on Sep. 9, 2015, entitled "METHOD AND SYSTEM FOR PROVIDING ORGANIZED CONTENT", which is hereby incorporated by reference in its entirety.

BACKGROUND

1. Technical Field

The present teaching relates to methods, systems, and programming for content service. Particularly, the present teaching is directed to methods, systems, and programming for providing organized content to a user.

2. Discussion of Technical Background

The development of the Internet leads to information explosion, where the information and data online are unorganized and have a huge volume. According, it is difficult to identify useful or interesting information for a particular user from the unorganized and abundant information.

A search engine may be a program that searches documents for specified queries and returns a list of documents where the queries are found. A search engine cannot provide content to a user without a query submitted by a user. A search result provided by a search engine depends only on the submitted query rather than other activities of the user. In addition, content items in a search result provided by a search engine are listed as independent items without organization.

A recommendation engine tries to provide popular content to users. Without considering activities of users, a recommendation engine recommends same content items to different users, and cannot assure any interest of the users in the recommended items.

Therefore, there is a need to develop techniques to provide content to a user to overcome the above drawbacks.

SUMMARY

The present teaching relates to methods, systems, and programming for content service. Particularly, the present teaching is directed to methods, systems, and programming for providing organized content to a user.

In one example, a method, implemented on a machine having at least one processor, storage, and a communication platform capable of connecting to a network for providing content to a user is disclosed. Information related to a user is obtained. One or more channels are determined for the user from a plurality of channels based on the information, wherein each of the plurality of channels includes one or more online content items. A personal interest space is established associated with the user based on the information related to the user and the one or more channels. Content is provided in the one or more channels to the user based on information related to the personal interest space.

In a different example, a system having at least one processor, storage, and a communication platform connected to a network for providing content to a user is disclosed, which includes a user information processor configured for obtaining information related to a user, an initial channel allocator configured for determining one or more channels for the user from a plurality of channels based on the information, wherein each of the plurality of channels includes one or more online content items, an initial interest space generator configured for establishing a personal interest space associated with the user based on the information related to the user and the one or more channels, and a channel based content recommender configured for providing content in the one or more channels to the user based on information related to the personal interest space.

Other concepts relate to software for implementing the present teaching on providing content to a user. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having data recorded thereon for providing content to a user is disclosed. The medium, when read by the machine, causes the machine to perform a series of steps, including, obtaining information related to a user; determining one or more channels for the user from a plurality of channels based on the information related to the user, wherein each of the plurality of channels includes one or more online content items; establishing a personal interest space associated with the user based on the information related to the user and the one or more channels; and providing content in the one or more channels to the user based on information related to the personal interest space.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 illustrates that channels in a personal interest space may change based on to user dynamic information, according to an embodiment of the present teaching;

FIG. 19 shows metadata associated with the personal interest spaces and channels, according to an embodiment of the present teaching;

DETAILED DESCRIPTION

Figure 1:
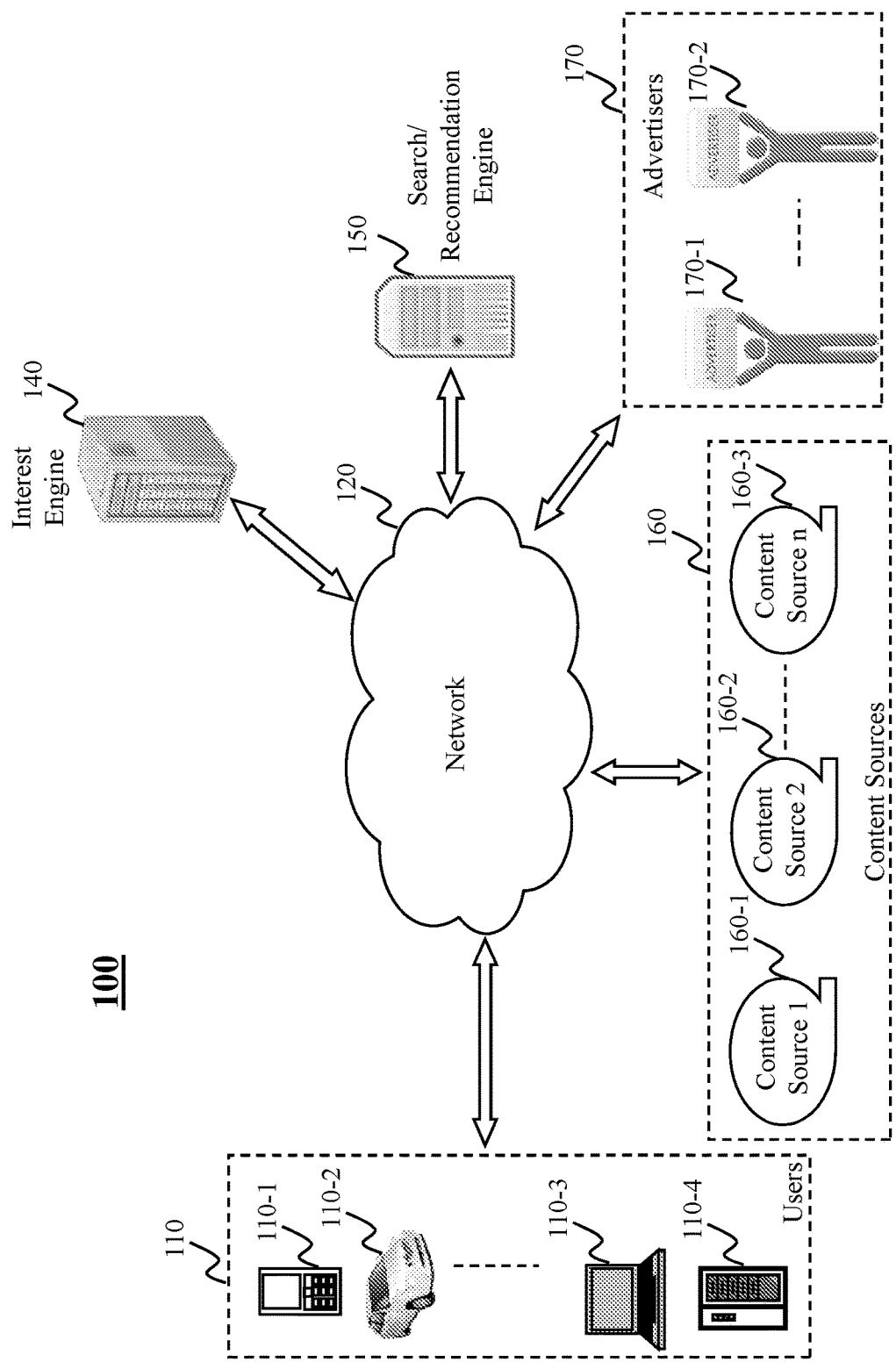
FIG. 1 is a high level depiction of an exemplary networked environment for providing organized content to a user, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of dynamically providing organized content to a user, realized as a specialized and networked system by utilizing one or more computing devices (e.g., mobile phone, personal computer, etc.) and network communications (wired or wireless). The method and system as disclosed herein aim at providing interesting content to a user in an effective and efficient manner.

One of the goals of the system in the present teaching is to redefine the way users consume web contents. The present teaching discloses a technology-driven interest-oriented content portal, "interest portal" in short, which facilitates users to efficiently define and explore their interests. The interest portal may be supported by an "interest engine" which seamlessly integrates the cutting-edge technologies of search and recommendation to enable a unique and personalized content consumption experience per user. The interest engine may evolve users' interest by continuously learning from their interactions with the contents as well as the social circles, and algorithmically deliver the most personally relevant contents with respect to users' interests. An interest engine may use an enriched user interest profile of a user as a query to identify organized content for the user.

The interest engine in the present teaching can organize online information into different channels. Each channel includes content items that are related to a common topic or category or have a common feature, e.g. popular items, hot items, etc. The interest engine may periodically crawl or search online for news or other content from the Internet, and classify the crawled or searched content items into different channels, according to their respective topics. This operation may not need any involvement of the users. A channel may also include one or more sub-channels, each of which includes content items associated with a sub-topic of the topic associated with the channel. For example, a channel associated with topic "sports" may include sub-channels associated with topics like "tennis," "basketball," "swimming," "running," etc. A channel may be correlated to another channel, based on a correlation between their respective topics. For example, channel "travel" may be correlated with channel "flight ticket"; channel "children" may be correlated with channel "minivan". Similarly, a sub-channel may be correlated with another sub-channel.

A user may subscribe to a channel (or a sub-channel) provided by the interest engine. In other words, the interest engine may assign a channel to a user after the user submits a subscription request for the channel. In addition, the interest engine may assign one or more channels to a user based on e.g. a query submitted by the user for channels, a channel previously assigned to the user, a channel subscribed to by the user, content items browsed or viewed by the user, channels associated with other users, or channels selected randomly for testing the user's interest.

The interest engine may store all channels assigned to a user into a personal interest space associated with the user. In addition to information about the channels, the personal interest space may also include information about: correlations between the channels, other users connected to the user, one or more channels shared by the user with other users, channel weights associated with the channels, etc. A channel weight associated with a channel in a personal interest space may indicate how important the channel is to the user or how interesting the channel is to the user. Different users can have different personal interest spaces.

Accordingly, the interest engine may also store different content channels associated with some metadata. For example, metadata associated with a channel may include information about: dynamic content provided by the interest engine through the channel, sub-channels in the channel, subscribed users of the channel, correlations between the channel and other channels, an assigned advertiser for the channel, etc. The interest engine may assign an advertiser to a channel based on a bidding process performed with respect to a plurality of advertisers. For example, based on a bidding process performed with respect to Apple Inc. and Samsung Group, the interest engine may assign one of them to channel "smartphone," such that the assigned advertiser has authority to put its advertisements into the channel.

The interest engine may provide dynamic content to a subscribed user through the channel. Dynamic content refers to content within a channel, when the interest engine can keep updating content in the channel based on newly obtained information from the Internet and/or activities of a subscribed user. After the interest engine assigns a channel to a personal interest space of a user, the channel may become a personal channel for the user, such that content provided through the channel to the user may be different from content provided to other users subscribed to the channel. For example, two users subscribed to channel "electronics" may gradually receive different content items provided by the interest engine, after one user clicks most articles in the channel about smartphone and the other user clicks most articles in the channel about digital camera.

In accordance with one embodiment, a plurality of specialized interest engines may be generated based on the interest engine (referred to as general interest engine accordingly) disclosed above. A specialized interest engine may have a similar structure to the general interest engine, except that the specialized interest engine provides content all associated with a specific entity, e.g. a particular website, a company, an organization, etc. An entity may build up a specialized interest engine quickly based on a general interest engine, e.g. based on a software development kit (SDK) in connection with the general interest engine, without a need to construct from scratch. In this scenario, different entities are associated with different specialized interest engines that are all connected to the general interest engine. This can form an ecosystem of interest engines, where the general interest engine may coordinate different specialized interest engines to maximize overall traffic of the ecosystem without overwriting the benefit brought by a specialized interest engine to the associated entity. For example, when a user views many content items in channels from a specialized interest engine and intends to leave, the specialized interest engine may provide the user content items from another specialized interest engine via the general interest engine, to keep the user.

The terms "content channel" and "channel" may be used interchangeably herein. The terms "personal interest space" and "interest space" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for providing organized content to a user, according to an embodiment of the present teaching. In FIG. 1, the exemplary networked environment 100 includes one or more users 110, a network 120, an interest engine 140, a search/recommendation engine 150, one or more advertisers 170, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to access and interact with online content provided by the interest engine 140 through wired or wireless technologies and related operating systems implemented within user-wearable devices (e.g., glasses, wrist watch, etc.). A user, e.g., the user 110-1, may send a request for online content to the interest engine 140, via the network 120 and receive content organized in channels through the network 120.

The interest engine 140 may serve as a backend for an interest portal associated with an entity, which may be an individual, a firm, or an organization, such as a television station, a newspaper issuer, a web page host, an online service provider, an app manager, or a game server. For example, interest engine 140 can be provided by an organization such as USPTO.gov, a content provider such as CNN.com and google.com, or a content-feed source such as tweeter or blogs. In one embodiment, interest engine 140 may be provided by entities that develop, support and/or provide online content via mobile applications (e.g., installed on smartphones, tablet devices, etc.).

The interest engine 140 aims at providing interesting content to a user without requiring many inputs from the user. Content provided by the interest engine 140 may include, for example, graphics, data, news, articles, software-based products, and so forth. The interest engine 140 may or may not provide software or app used to access the content.

Referring to the above example, the content sent to user 110-1 may be generated by the interest engine 140 based on the content sources 160. A content source may correspond to an entity where the content was originally generated and/or stored. For example, a novel may be originally printed in a magazine, but then posted online at a web site controlled by a content provider managing the interest engine 140. The content sources 160 in the exemplary networked environment 100 include multiple content sources 160-1, 160-2 . . . 160-3.

A user may also submit a search query to the interest engine 140 via an interest portal. The interest engine 140 may forward the query to the search/recommendation engine 150 for performing a search based on the query. In one embodiment, the query may be used to search for a channel stored in the interest engine 140. When there is no channel matching the query, the interest engine 140 may provide an option for the user to create a new channel based on the query and subscribe to the new channel. When the user is entering the query via the interest portal, the interest engine 140 may provide query suggestions each of which is a name of a channel stored at the interest engine 140. In another embodiment, the query may be used to search for content items within one or more channels stored in the interest engine 140.

The interest engine 140 may also cooperate with the search/recommendation engine 150 to recommend a channel or a content item within a channel to a user. The recommendation may be based on the user's assigned channels, the user's activities, or other information related to the user.

It can be understood that the search/recommendation engine 150 may also perform regular search and recommendation operations based on unorganized content online. It can also be understood that in some embodiment, the search engine and the recommendation engine are separate from each other.

When content is sent to the user 110-1, one or more advertising opportunities may be available for one or more advertisements to be presented with the content to the user 110-1, through a same channel, on a same web page, via a same application, or in a same user session. For an available advertising opportunity, the interest engine 140 may send an ad request to advertisers 170 to ask for advertisements. In one embodiment, the ad request may include a bid request, such that the interest engine 140 can sell the advertising opportunity by soliciting bids from the advertisers 170.

An advertiser, e.g. 170-1, may correspond to an entity, whether an individual, a firm, or an organization, doing or planning to do (or otherwise involved in) advertising business. As such, an advertiser 170-1 may be an entity that provides product(s) and/or service(s), and itself handles the advertising process for its own product(s) and/or service(s) at a platform (e.g., websites, mobile applications, etc.). For example, advertisers 170-1 . . . 170-2 may include companies like General Motors, Best Buy, or Disney. In some other cases, however, an advertiser 170-1 may be an entity that only handles the advertising process for product(s) and/or service(s) provided by another entity. In one embodiment, the advertisers 170 have stored their advertisements at an ad database connected to the interest engine 140.

Figure 2:
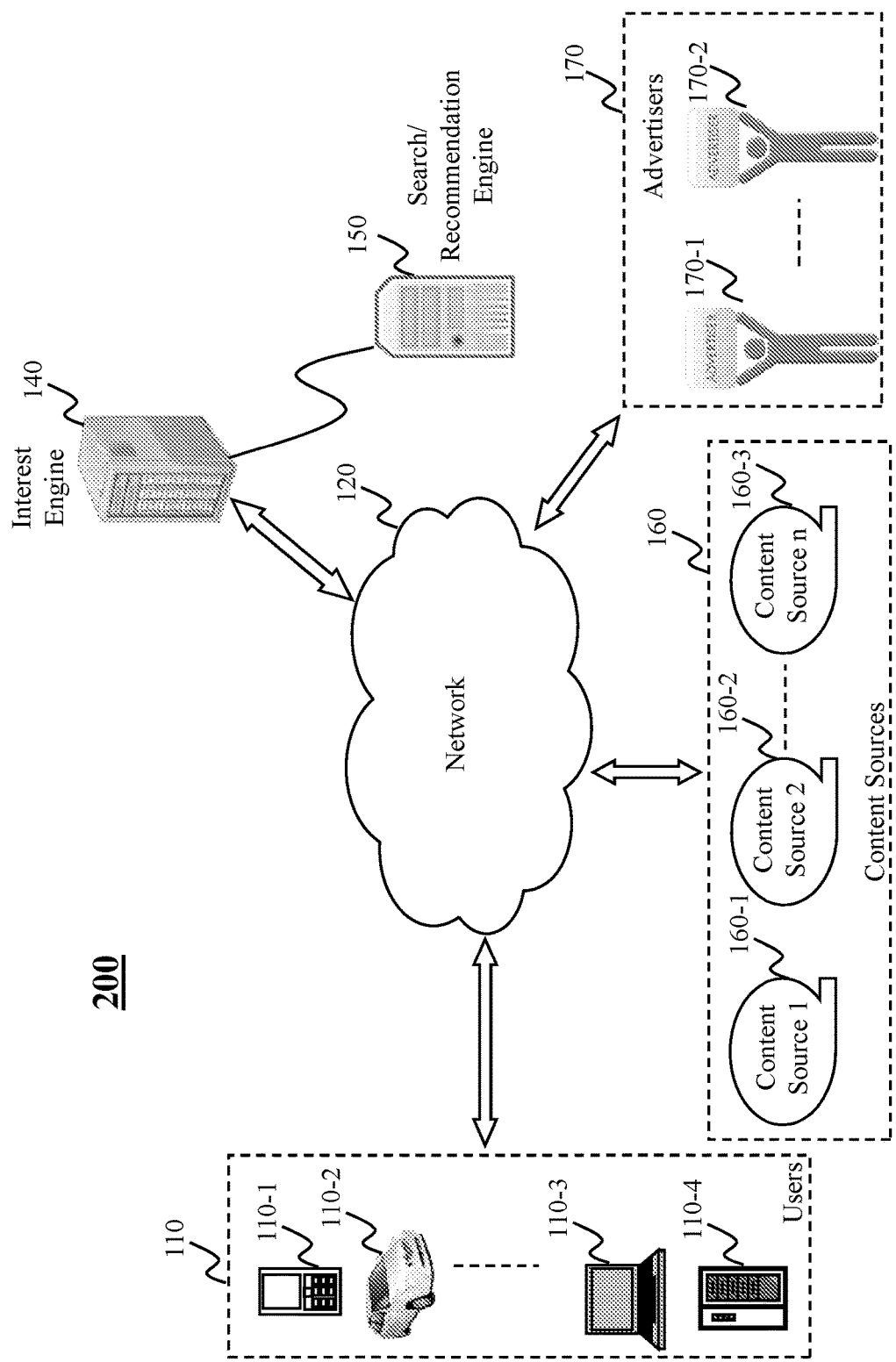
FIG. 2 is a high level depiction of another exemplary networked environment for providing organized content to a user, according to an embodiment of the present teaching.

FIG. 2 is a high level depiction of another exemplary networked environment 200 for providing organized content to a user, according to an embodiment of the present teaching. The exemplary networked environment 200 in this embodiment is similar to the exemplary networked environment 100 in FIG. 1, except that the search/recommendation engine 150 serves as a backend system for the interest engine 140.

Figure 3:
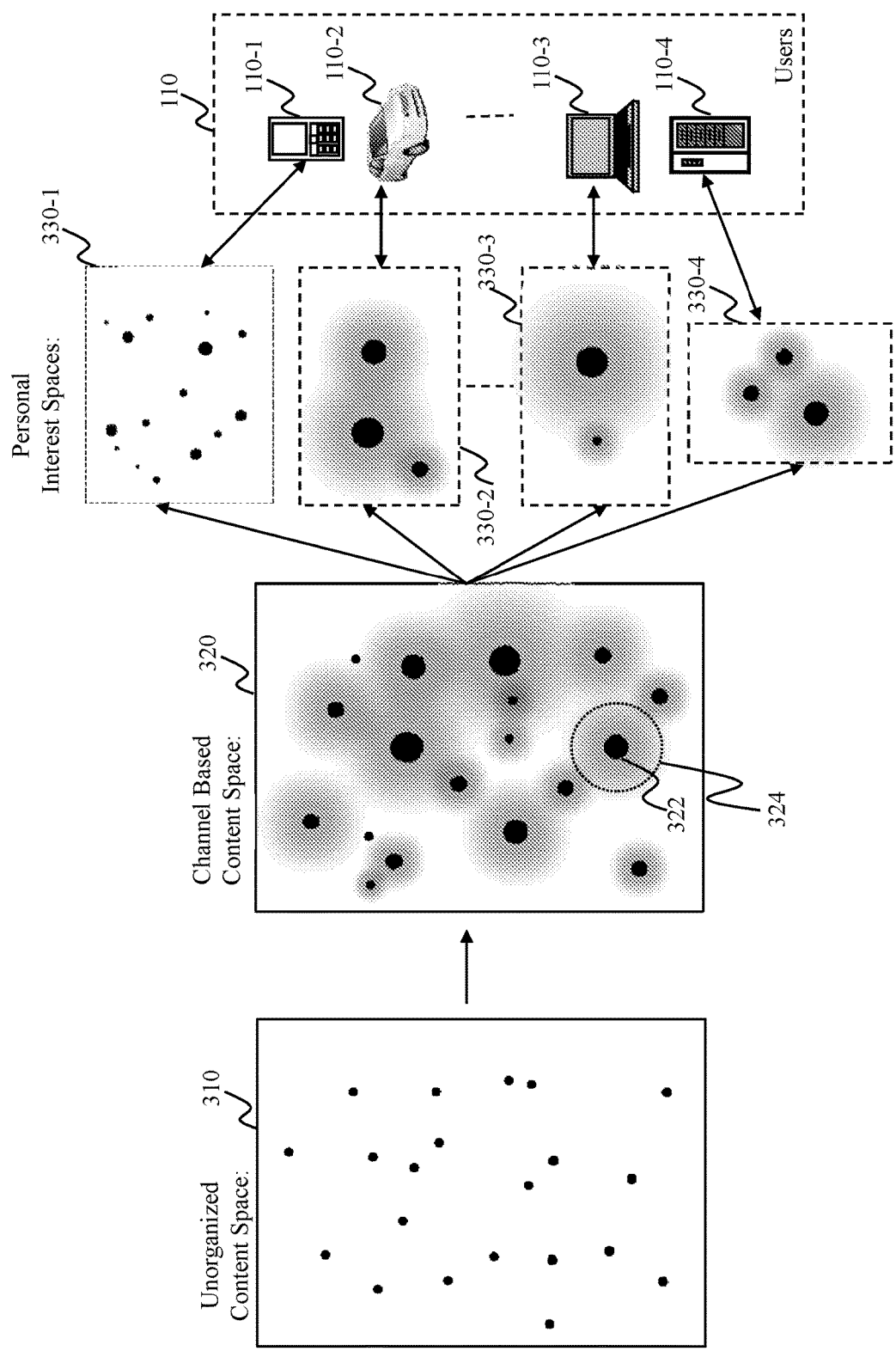
FIG. 3 illustrates generation of personal interest spaces for different users based on channels, according to an embodiment of the present teaching.

FIG. 3 illustrates generation of personal interest spaces for different users based on channels, according to an embodiment of the present teaching. As shown in FIG. 3, an unorganized content space 310 includes content items as discrete and unorganized dots that cannot be easily tracked or managed. The unorganized content space 310 may include at least part of all information online or on the Internet.

To have an easy management of the online content, an interest engine may organize all content in the unorganized content space 310 to generate a channel based content space 320, where content items are categorized into different channels each of which is represented by a bundle of dots in FIG. 3. Each bundle of dots represents content items that are related to a common topic or share a common feature. A bundle may have a core which includes content items that are in the bundle and have a close relationship with the topic. For example, the bundle 324 may represent a channel including articles and documents related to "Apple products." In this case, the core 322 of the bundle 324 may include articles and documents that include official information about Apple Inc., e.g. from its official website apple.com, or from an official person working at Apple Inc. The rest articles in the bundle 324 may include information from technology related websites and social networks. While different bundles may have different sizes, depending on their content volumes; a bundle's core may also have a different size from another bundle's core.

As discussed above, the channels in the channel based content space 320 are dynamically changing. For example, a newly generated article may be added to a channel if the article is related to the topic associated with the channel. In another example, a document originally assigned to a first channel may be reassigned to a second channel when the interest engine determines that the article is more related to the second channel than the first channel. In yet another example, a document or article may be assigned to multiple channels when the document or article is related to all these channels. In a different example, a document or file may be divided into multiple content items each of which can be assigned to a channel. Accordingly, each channel includes one or more dynamic content items.

As discussed above, the interest engine may assign a channel to a user, based on a subscription request or the user's activities on the interest portal. For each user, the interest engine can establish a personal interest space associated with the user. Each personal interest space may include one or more channels from the channel based content space 320. As shown in FIG. 3, different users are associated with different personal interest spaces. For example, user 110-1 is associated with personal interest space 330-1 which includes some channels that are different from other personal interest spaces. This may indicate that different users have different interests. It can be understood that two users' personal interest spaces may have some common channels because the two users have common interests.

A channel may be correlated with another channel based on e.g. their respective topics, their respective subscribed users, their respective assigned advertisers, etc. A correlation between two channels may be represented by a distance between the two corresponding bundles shown in FIG. 3.

The interest engine can store the channels and personal interest spaces with associated metadata. FIG. 19 shows metadata associated with the personal interest spaces and channels, according to an embodiment of the present teaching. As shown in FIG. 19, a channel, e.g. channel C1 1912, is associated with metadata including: dynamic content in the channel, correlation coefficients with other channels, users subscribed to the channel, advertiser assigned to the channel, and other information, as listed in table 1910.

The dynamic content is being updated and added based on dynamic information on the Internet. As the information on the Internet is updating every second, the interest engine may update the content in each channel accordingly, e.g. by crawling new content from the Internet.

In one embodiment, the interest engine may support an interest portal that serves as a news reader for a user. In this embodiment, the interest engine crawls, analyzes and indexes hundreds of millions of news articles from tens of thousands of high-quality news, blogs, forums, as well as major social media sites. The interest engine may develop user interest profiles by learning from all kinds of user behavior data and deliver personalized news articles accordingly to the news reader's PC web and/or mobile users. This news reader allows users to self-define any interests at their will, or subscribe interests out of numerous algorithmically generated and recommended polymorphic interests in a rich format of social tags, categories, topics, keywords, or news sources at any granularity from any perspective. It thus well satisfies users' entire interest spectrum especially long-tail interest and highly informative deep contents instead of popular interest and entertainment driven shallow contents only. This news reader makes news reading a rewarding experience rather than time-killing. Users can proactively pull contents as what search engines do, passively receive contents as recommendation engines do, or anywhere between. Throughout the entire experience, users are empowered with various ways to refine their interests such as like/dislike, interactive question answering, social tagging, topic browsing/subscription, clicks/skips, social sharing/commenting, etc.(more innovative interactions are under the way), from which the new reader learns users' precise preferences. The more a user interacts with the new reader, the better news reader understands the user, and thus the more personally relevant contents will be delivered per user's interest. By providing the most wanted contents only, the news reader provides a better way to conquer the information-overloading problem in this information explosion era. It can be understood that similar implementations can be extended to other domains and even the entire web.

A correlation coefficient, e.g. Cor12, may a value that indicates a degree of correlation between channels C1 and C2. In one embodiment, the correlation coefficient may be a numerical number between 0 and 1, where a larger correlation coefficient means a higher degree of correlation.

A channel may be subscribed to by many users. The interest engine can provide dynamic content through this channel to the subscribed users. In addition, the interest engine can also provide the dynamic content to other assigned users, each of whom may be assigned to the channel based on: the user's online activities, social relationship with another user who is subscribed to the channel, another channel assigned to the user and correlated to the channel, etc.

A channel may be associated with an assigned advertiser who has authority to put advertisements through this channel. Different advertisers can bid for being assigned to a channel for a time period. The interest engine can choose one or more from the advertisers based on their respective bids. In one example, Apple Inc. and Samsung Group may bid to be an assigned advertiser for the channel "smartphone" during a time period, e.g. a year, a month, or a week. The interest engine can determine one of them to be the assigned advertiser for the channel, such that users assigned to the channel can receive through the channel not only content within the channel but also advertisements from the assigned advertiser. In another example, a channel "Apple products" or "Apple Inc." can be open for bidding, such that a company other than Apple may be an assigned advertiser for the channel.

As shown in FIG. 19, a user, e.g. user U1 1922, is associated with metadata including: a personal interest space represented by an interest space ID; channels associated with the user based on subscription, activities, channel expansion, or random push; channel weights corresponding to the associated channels; other users connected to the user; channels shared by the user; and other information, as listed in table 1920.

As discussed above, a user may be associated with a personal interest space which includes one or more associated channels. Each of the channels is associated with a channel weight that may indicate how important the channel is to the user. For example, a channel weight may be a percentage number and the sum of all channel weights associated with a user is equal to one. In this case, each weight represents how interesting the channel is to the user, relative to other associated channels. The interest engine may provide or recommend content to the user according to the channel weights, unless the user specifies a channel to receive content. For example, the channel weight of channel C1 for user U1 is 20%, which means without user's indication of a specific channel, the interest engine may provide dynamic content to the user with 20% of the content comes through channel C1.

A user may be connected to other users, each of whom may be a friend, a relative, a colleague, or a classmate of the user. Two user IDs may be determined to be connected based on the above relationship, or other information like: the two user IDs are registered with a same email address; the two user IDs are connected in a social network; the two user IDs had online communications before, etc.

A user may share one or more of the user's associated channels with other users, such that all other users can view the shared channels of the user. This may be helpful to other users, as a shared channel may have been personalized for the user based on the user's activities. The other users who are not aware of the channel before and are interested in similar topics may feel easy to learn from this user's personalized shared channel. It can be understood that the user may share a channel to merely users connected to the user.

Figure 20:
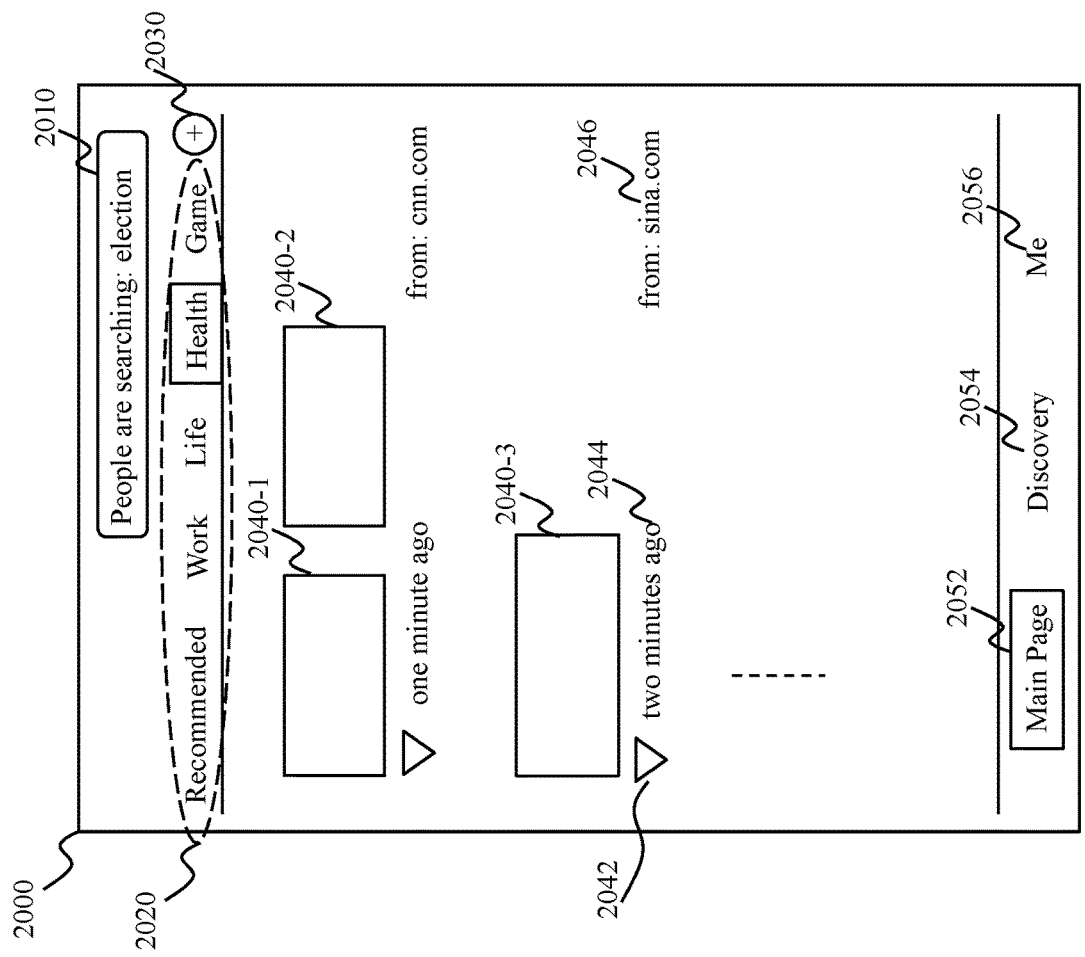
FIG. 20 shows an exemplary user interface of an interest portal supported by an interest engine, according to an embodiment of the present teaching.

FIG. 20 shows an exemplary user interface 2000 of an interest portal supported by an interest engine, according to an embodiment of the present teaching. The user interface 2000 may be a user interface of an app supported by an interest engine and stored on a user's device or may be a user interface of an interest portal's website supported by an interest engine.

As shown in FIG. 20, the user interface 2000 includes a search box 2010 within which a description about what people are searching is displayed. In one embodiment, the description may be displayed in a transparent or dimmed font. The description may disappear automatically once the user starts to input in the search box 2010. After the user starts to enter something in the search box 2010, one or more query suggestions may be provided to the user via the user interface 2000. Each of the query suggestions may be a channel name. The query suggestions corresponding to different channels may be ranked according to the number of users assigned to each of these channels. After the user enters a query and clicks a search button, the interest engine may run a search, e.g. with help of a search engine, to find channels matching the query. If no existing channel is found to match the query, the user may be provided an option to create a new channel matching the query. The new channel may be created based on the user's confirmation and assigned to the user accordingly.

The user interface 2000 also includes multiple channel icons 2020, each of which indicates a channel associated with the user. For example, channel "health" is activated in FIG. 20, such that many health-related content items 2040, which may be articles, images, videos, or documents, are presented to the user via the user interface 2000. The content items may be organized according to data source 2046 and/or update time 2044. For example, the content item 2040-3 is obtained from sina.com and was updated or uploaded two minutes ago when the user views the user interface 2000. The user may click a content item to access a detailed view of the content item. The user may also click the arrow 2042 to have more options about the corresponding content item, e.g. to indicate whether the user likes or dislikes the content item; to share the content item with others; to view more content items like this one; etc.

The channel "recommended" may be assigned to each user; but includes different content items for different users. The content items in the channel "recommended" may be related to the other channels assigned to the user and/or based on hot topics among all users. The channel "Work" and "Life" may be assigned to each user; but include different content items for different users. For example, a user may self-define what sub-channels should be put into the channel "Work," which may include content items related to the user's work. The user may also self-define what sub-channels should be put into the channel "Life," which may include content items related to the user's personal life.

Based on the user's interactions with the user interface 2000, the interest engine can determine channel weights for different channels. For example, if the user spends most time on content items in the channel "health," the interest engine may display more content items in the channel "health" and/or recommend more content items related to health in the channel "recommended." The interest engine may also recommend content items based on the time, e.g. recommending more work-related items to the user during work time or work days, and recommending more life-related items to the user during off-work time, weekends or holidays. The user can click the add button 2030 to select more channels to add to his/her personal interest space.

The user interface 2000 may also include control buttons like: "main page" 2052; "discovery" 2054; and "Me" 2056. As shown in FIG. 20, the button "main page" 2052 is activated and the user is now viewing the main page of the app or portal. When the user clicks the button "discovery" 2054, the user may be directed to content items and/or channels that are popular to other users, and may not be related to his/her subscribed channels. When the user clicks the button "Me" 2056, the user may be directed to settings including personal settings regarding this app or portal.

It can be understood that in other embodiments, other user interfaces or other layouts of the user interface may also achieve similar effects as the user interface 2000 shown in FIG. 20.

Figure 4:
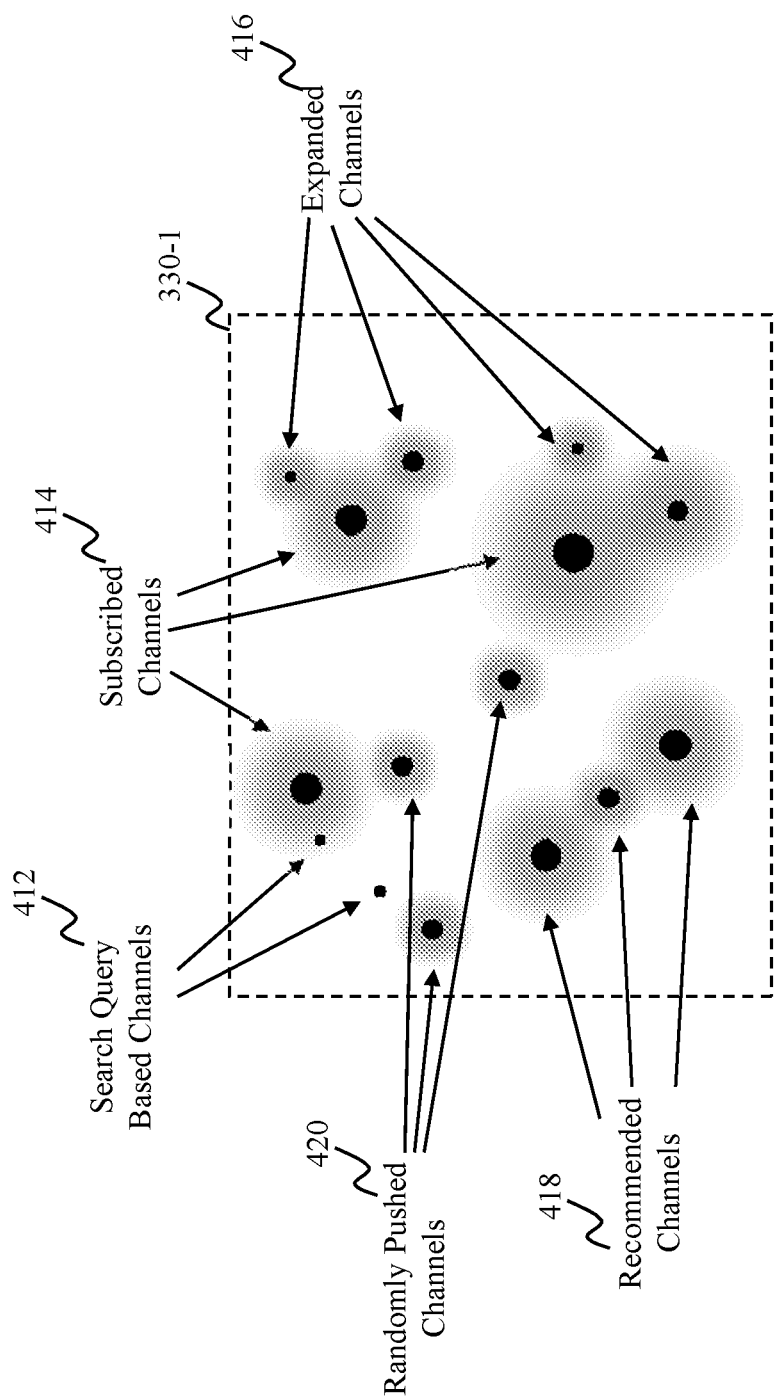
FIG. 4 illustrates that different channels can be assigned to a personal interest space based on different reasons, according to an embodiment of the present teaching.

FIG. 4 illustrates that different channels can be assigned to a personal interest space based on different reasons, according to an embodiment of the present teaching. As shown in FIG. 4, the personal interest space 330-1 associated with a user includes many channels that are assigned to the user for different reasons. Channels 412 may be assigned to the user based on search queries submitted by the user. For example, the channels may be newly created for the user based on the search queries. Channels 414 may be assigned to the user based on subscription requests from the user, which are explicit inputs from the user to indicate the user's interest. Channels 416 may be expanded channels based on other channels. For example, after a user is subscribed to channel "Ping-Pong," the interest engine may expand to include another channel "table tennis," which may even be combined to the channel "Ping-Pong." After a user is subscribed to channel "sports," and clicks lots of articles related to basketball, the interest engine may expand his/her personal interest space to include another channel "basketball." Channels 418 may be recommended to the user based on the user's other assigned channels, the user's activities, and/or popular channels among other users. For example, after a user is subscribed to channel "hard work," the interest engine may recommend to the user another channel "health"; and after a user is subscribed to channel "lottery winner," the interest engine may recommend to the user another channel "finance management". Channels 420 may be pushed to the user randomly to test the user's other unexplored or implicit interests. For example, although the user has not subscribed to any channel related to games and has not expressed any interest in games, the interest engine may randomly send some channels including a channel "games" or content through the channels to the user. If the user turns out to be interested in them, the user may subscribe to them. Otherwise, if the user turns out to be not interested in them, the interest engine may delete them and randomly push another set of channels. This may be helpful especially to inactive users who do not have many activities on the portal or the app.

FIG. 5 illustrates that channels in a personal interest space may change based on to user dynamic information, according to an embodiment of the present teaching. As shown in FIG. 5, a personal interest space of a user may change due to dynamic information from the user. Dynamic information may include: the user's interaction with the app or the portal supported by the interest engine; the user's affinity with other users obtained from e.g. a social network; the user's online behavior observed on other apps or other websites. One or more channels may change, e.g. increase size from 502 to 512, decrease size from 508 to 518; or change location from 506 to 516, due to the dynamic information. The interest engine may remove channels from the personal interest space (from 509 to 519), e.g. after receiving unsubscription requests or after the user has not viewed any content item in the channels for a time period. The interest engine may also add a channel 517 into the personal interest space, e.g. after receiving a subscription request or after the user has viewed many content items related to the channel 517.

In one embodiment, the interest engine may import a user's connection with other users from a social network, e.g. Facebook. Based on the connection, the interest engine may better determine the user's interest, e.g. by inferring the user's interest from channels assigned to his/her connected users.

In another embodiment, the interest engine may import a user's online behavior from another website, e.g. amazon.com. Based on the online behavior, the interest engine may better determine the user's interest, e.g. after a user buys a book about Steve Jobs from amazon.com, the interest engine may recommend channel "Steve Jobs" or channel "technology celebrity" to the user, even if the user has not expressed any interest about Steve Jobs through the app or interest portal.

Figure 6:
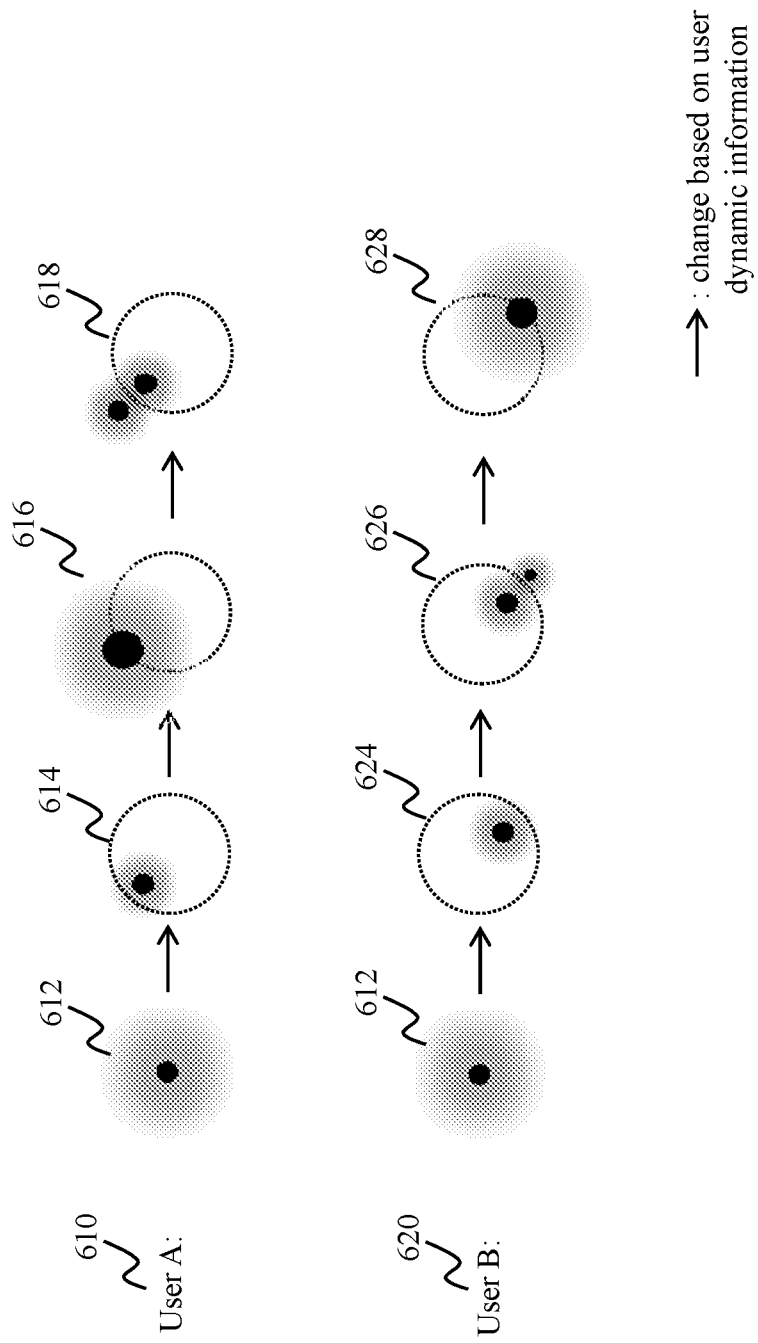
FIG. 6 illustrates that two users associated with same channel at the beginning may end up with different subscribed content, according to an embodiment of the present teaching.

FIG. 6 illustrates that two users associated with same channel at the beginning may end up with different subscribed content, according to an embodiment of the present teaching. As shown in FIG. 6, user A 610 and user B 620 are both associated with channel 612. At the beginning, they can receive the same content items through the channel. As time goes by, they may have different dynamic information or activities regarding the channel. For example, after the two users subscribe to channel "sports," user A may view content items mostly related to football, while user B may view content items mostly related to basketball. Then, the channel may change into different directions for the two users, one into football related items at 614 and the other into basketball related items at 624. Then, user A is associated with channel "football"; and user B is associated with channel "basketball."

Then if user A keeps viewing more and more football related items, the interest engine may increase the size of the channel 616 now related more to tennis than sports in general. The interest engine may also split the football channel associated with user A into two channels "American Football" and "Soccer" at 618, if the user turns out to be interested in both of the channels.

If user B also views articles related to NBA players, the channel "NBA players" may be assigned to user B and correlated to the channel "basketball" for the user B, at 626. In one embodiment, at 628, the interest engine may merge the channel "NBA players" and the channel "basketball" for user B such that user B can easily access interesting content items from the two related topics.

Figure 7:
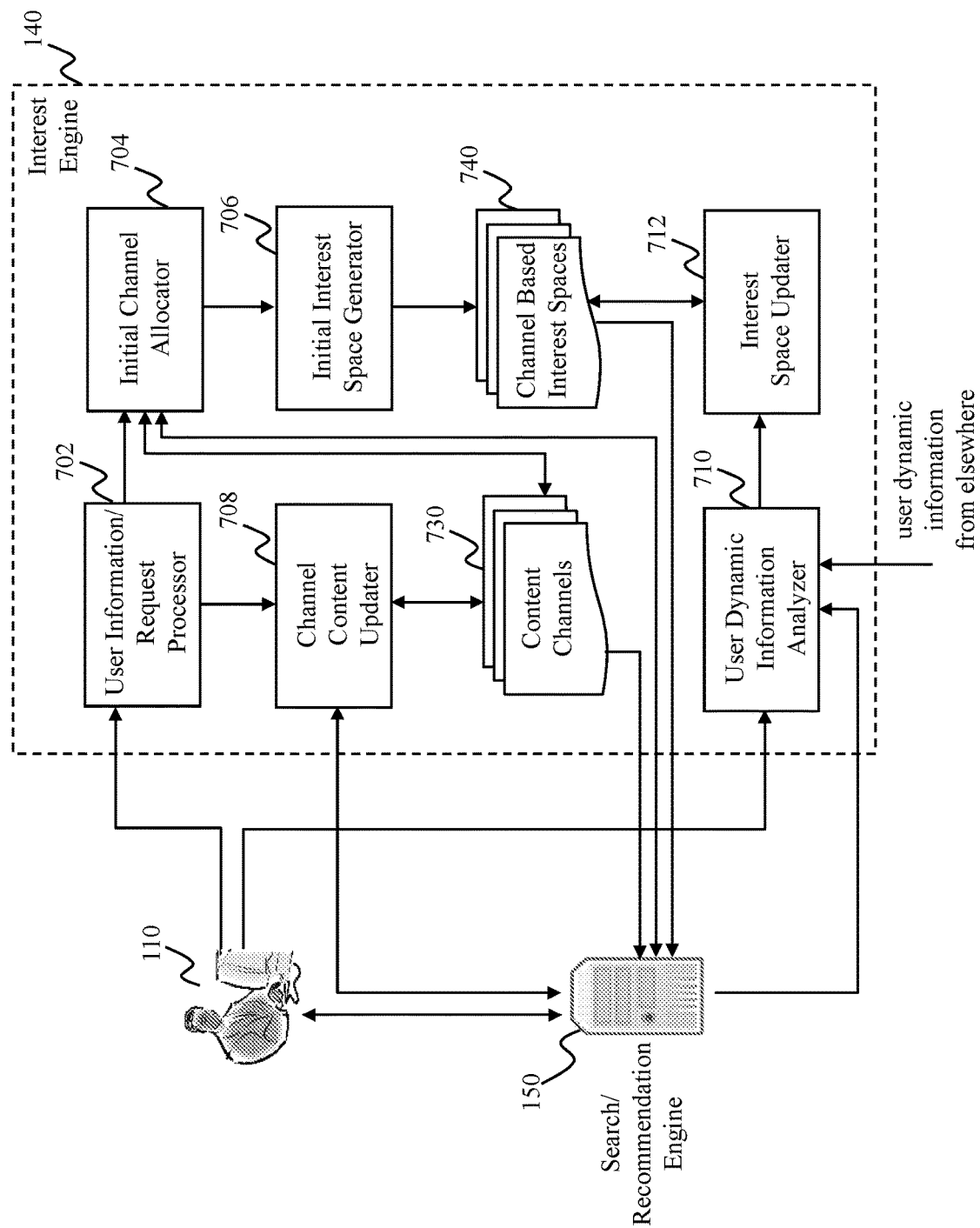
FIG. 7 illustrates an exemplary diagram of an interest engine, according to an embodiment of the present teaching.

FIG. 7 illustrates an exemplary diagram of an interest engine 140, according to an embodiment of the present teaching. In this example, as shown in FIG. 7, the interest engine 140 includes a user information/request processor 702, an initial channel allocator 704, an initial interest space generator 706, a channel content updater 708, content channels 730, channel based interest spaces 740, a user dynamic information analyzer 710, and an interest space updater 712.

The user information/request processor 702 in this example receives user information or a request from the user 110. The user information may include the user's demographic information, the user's personal information provided by the user at registration or imported from another website, the user's input during initial setting when the user logs in the app or portal for the first time, etc. For example, the user information may indicate that the user is male, 35, working as a software engineer, likes software and Internet during work time, and likes sports and games during weekend. The request may be a subscription request from the user to subscribe to a channel, an un-subscription request from the user to unsubscribe from a channel, or a content update request to update content in a channel of the user's personal interest space.

Based on the user information or the request, the initial channel allocator 704 may allocate channels for the user. The channel allocation may be based on the user's demographic information and initial setting when the user logs in the app or portal for the first time. The channel allocation may also be based on a search query submitted by the user to the search/recommendation engine 150 or to the interest engine 140 directly. The search query may be for searching content items or channels. In one example, the initial channel allocator 704 may allocate an existing channel in the content channels 730 matching the user's query to the user. In another example, the initial channel allocator 704 may generate a new channel that is not in the content channels 730 and matches the user's query, and allocate the new channel to the user.

The initial interest space generator 706 in this example can generate a personal interest space for the user based on the channels allocated to the user by the initial channel allocator 704. The personal interest space may include information about the channels allocated to the user, and user information about the user. The interest space is personal because it represents interest of the user in terms of different channels. The initial interest space generator 706 may store the personal interest space as one of the channel based interest spaces 740.

Based on the personal interest space, the search/recommendation engine 150 may provide content items to the user 110 through channels in the personal interest space. In one embodiment, the search/recommendation engine 150 may be part of the interest engine 140. In another embodiment, the interest engine 140 may also perform similar functions as the search/recommendation engine 150.

The channel content updater 708 in this example may update content of a channel, based on a request or a timer. As content in the Internet keeps changing and updating, the channel content updater 708 may obtain most updated content items from the Internet and assign them into different channels according to their related topics. The channel content updater 708 may perform the updating periodically or upon a request from the user 110. In one embodiment, the channel content updater 708 may cooperate with the search/recommendation engine 150 to search for new information on the Internet for updating corresponding channels.

The user dynamic information analyzer 710 in this example may obtain the user's dynamic information. The dynamic information may include the user's interaction with the interest engine 140, the app or the interest portal supported by the interest engine 140. The dynamic information may also include the user's interaction with the search/recommendation engine 150. The dynamic information may also include the user's social connection with other users, from a social network. The dynamic information may also include the user's online behavior from other websites or other apps. The user dynamic information analyzer 710 can analyze the dynamic information to generate user interest information associated with the user, and send the user interest information to the interest space updater 712.

The interest space updater 712 in this example receives the user interest information and determines whether to update the personal interest space of the user. For example, if the user interest information indicates a new interest of the user that has not been included in any channel assigned to the user, the interest space updater 712 may determine to update the personal interest space of the user by adding a new channel to catch the new interest of the user. The interest space updater 712 may retrieve and update the personal interest space of the user, and store it back.

Figure 8:
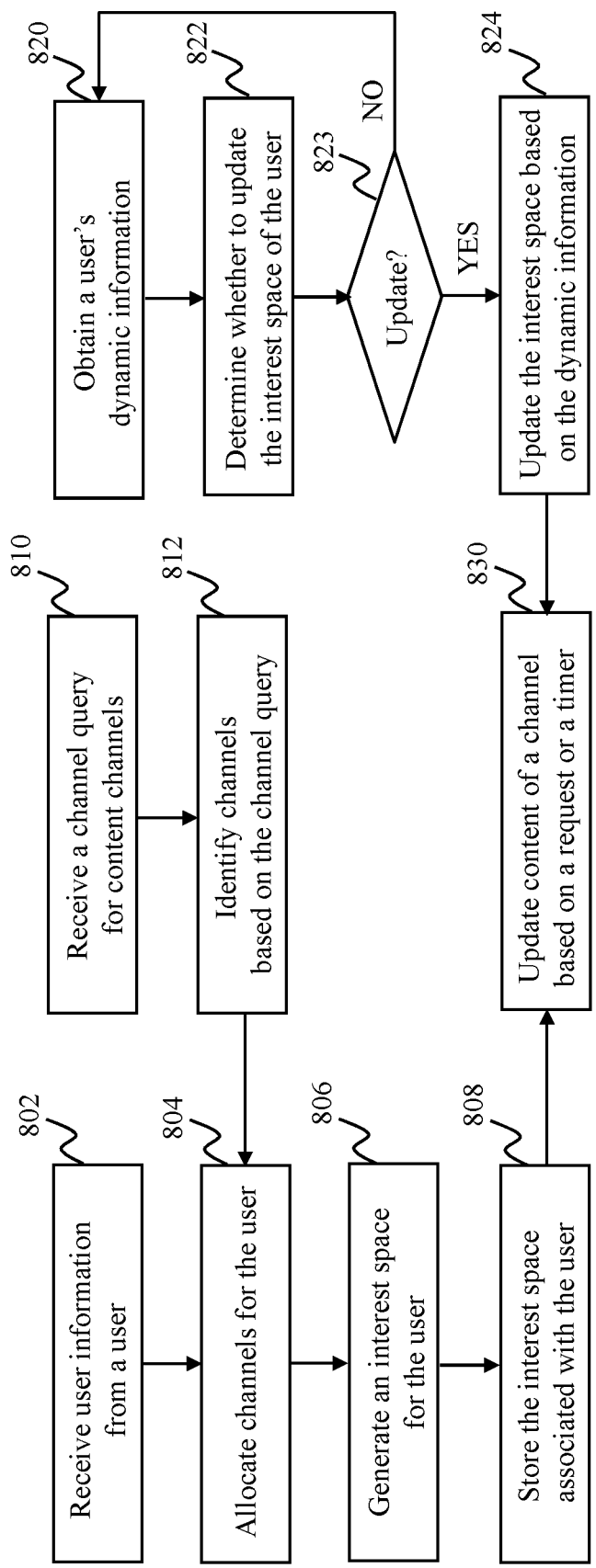
FIG. 8 is a flowchart of an exemplary process performed by an interest engine, according to an embodiment of the present teaching.

FIG. 8 is a flowchart of an exemplary process performed by an interest engine, according to an embodiment of the present teaching. The interest engine may be the interest engine 140 or an interest engine that includes functions of the search/recommendation engine 150 as well.

At 802, user information from a user is received. Then, the process moves on to 804. In one embodiment, a channel query for content channels is received from the user at 810; one or more channels are identified based on the channel query at 812; and the process goes on to 804. At 804, channels are allocated to the user based on the user information and/or the channel query.

A personal interest space of the user is then generated at 806 based on the allocated channels. At 808, the interest engine can store the personal interest space associated with the user. The process then moves on to 830 to update content of a channel based on a request or a timer.

In one embodiment, the process also includes 820 to 824. The user's dynamic information is obtained at 820. Then at 822, the interest engine can determine whether to update the personal interest space of the user based on the dynamic information. If it is determined not to update the personal interest space at 823, the process goes back to 820. Otherwise, if it is determined to update the personal interest space at 823, the process go on to 824, where the personal interest space is updated based on the dynamic information. The process may then go to 830 to update content of a channel based on a request or a timer.

Figure 9:
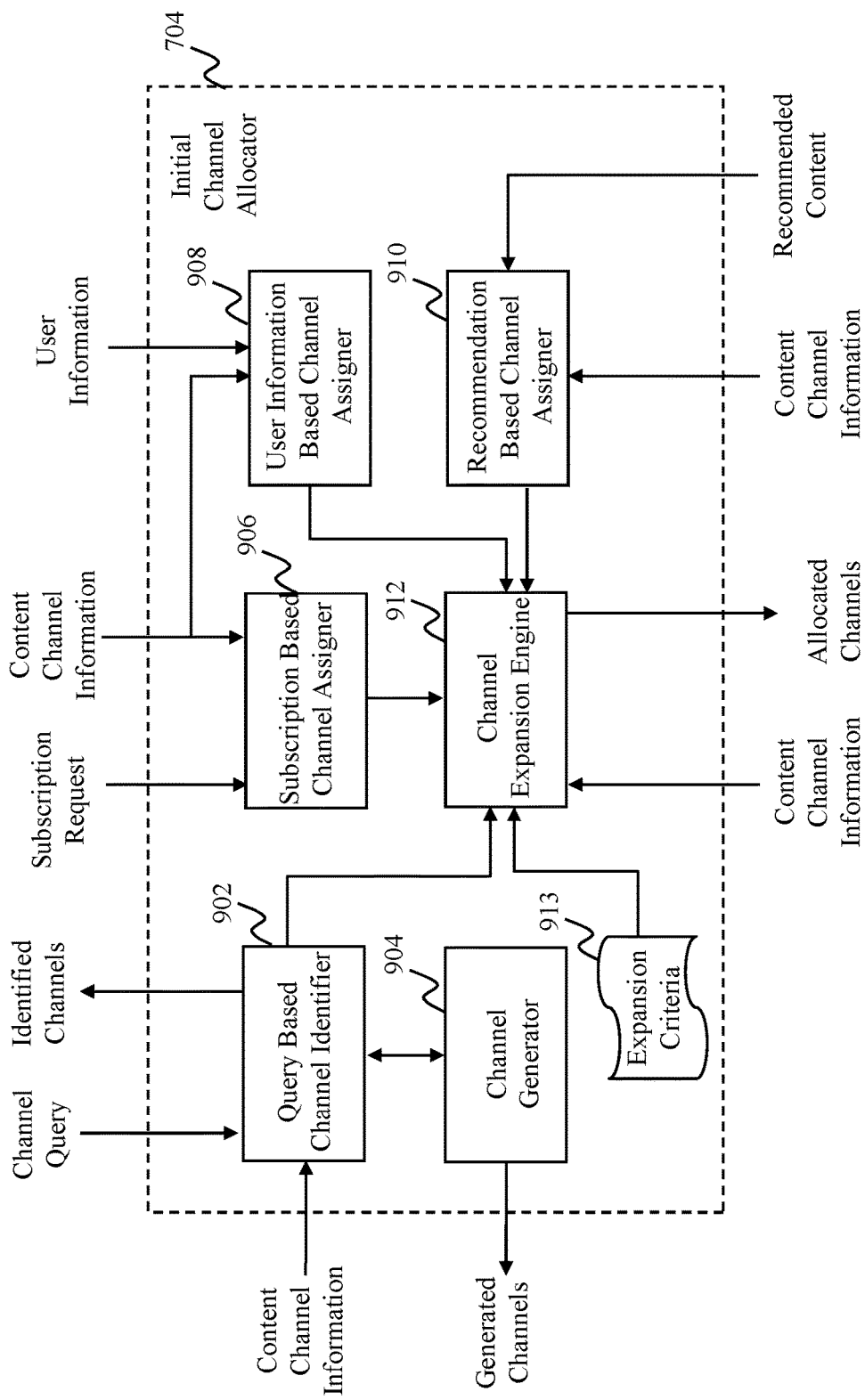
FIG. 9 illustrates an exemplary diagram of an initial channel allocator, according to an embodiment of the present teaching.

FIG. 9 illustrates an exemplary diagram of an initial channel allocator 704, according to an embodiment of the present teaching. In this example, the initial channel allocator 704 includes a query based channel identifier 902, a channel generator 904, a subscription based channel assigner 906, a user information based channel assigner 908, a recommendation based channel assigner 910, a channel expansion engine 912, and expansion criteria 913.

The query based channel identifier 902 in this example may receive a channel query for channels, either from the search/recommendation engine 150 or directly from the user 110. The query based channel identifier 902 can obtain content channel information from the stored channels 730, and identify one or more channels whose channel information matches the channel query. The query based channel identifier 902 may send the identified channel(s) to the search/recommendation engine 150 or to the user 110 directly, in response to the query. In one embodiment, the query based channel identifier 902 may also send the identified channel(s) to the initial interest space generator 706 for generating a personal interest space for the user. In another embodiment, the query based channel identifier 902 may also send the identified channel and/or a new channel generated by the channel generator 904 to the channel expansion engine 912 for channel expansion.

If no existing channel is identified from the channels 730 based on the query, the query based channel identifier 902 may send the query to the channel generator 904 for generating a new channel. The channel generator 904 in this example receives the query from the query based channel identifier 902 and generates a new channel based on the query. The channel generator 904 may send the new channel to the query based channel identifier 902, to the search/recommendation engine 150 or to the user 110 directly, in response to the query. In one embodiment, the channel generator 904 may also send the new channel to the initial interest space generator 706 for generating a personal interest space for the user.

The subscription based channel assigner 906 in this example may receive a subscription request from a user for subscribing to a channel. The subscription based channel assigner 906 may retrieve content channel information from the stored channels 730, and assign a channel to the user based on the request. The subscription based channel assigner 906 may send information about the subscribed channel to the channel expansion engine 912 for channel expansion. In one embodiment, the subscription based channel assigner 906 may receive an un-subscription request from the user, and unsubscribe the user from the corresponding channel.

The user information based channel assigner 908 in this example may receive user information from the user information/request processor 702. The user information based channel assigner 908 may retrieve content channel information from the stored channels 730, and assign one or more channels to the user based on the user information. For example, if the user information indicates that the user is a mom and likes children related articles, the user information based channel assigner 908 may assign channels like "children health", "children songs", etc. to the user. The user information based channel assigner 908 may send information about the user information based channel assignment to the channel expansion engine 912 for channel expansion.

The recommendation based channel assigner 910 in this example may receive recommended content for a user from the search/recommendation engine 150. The recommendation based channel assigner 910 may retrieve content channel information from the stored channels 730, and assign a channel to the user based on the recommended content, such that the recommended content may be provided to the user through the channel. The recommendation based channel assigner 910 may send information about the recommended channel to the channel expansion engine 912 for channel expansion.

The channel expansion engine 912 in this example may receive channels assigned to the user from the query based channel identifier 902, the subscription based channel assigner 906, the user information based channel assigner 908, and the recommendation based channel assigner 910. The channel expansion engine 912 may expand more channels for the user. The channel expansion engine 912 may select one of the expansion criteria 913 and expand channels based on it. An expansion criterion may specify a condition that when met can cause an expansion of channels. For example, when a channel assigned to a user has one or more channels correlated to it, the channel expansion engine 912 may expand to assign the one or more channels to the user if the correlations between the channel and the one or more channels are greater than a threshold. In another example, when a user is assigned to a first channel, the channel expansion engine 912 may expand to assign a second channel to the user if the number of users who are assigned to both the first and the second channels is greater than a threshold. After the channel expansion, the channel expansion engine 912 may send the allocated channels (including the assigned channels based on query, subscription, user information, recommendation, and the expanded channels) to the initial interest space generator 706 for generating a personal interest space for the user.

Figure 10:
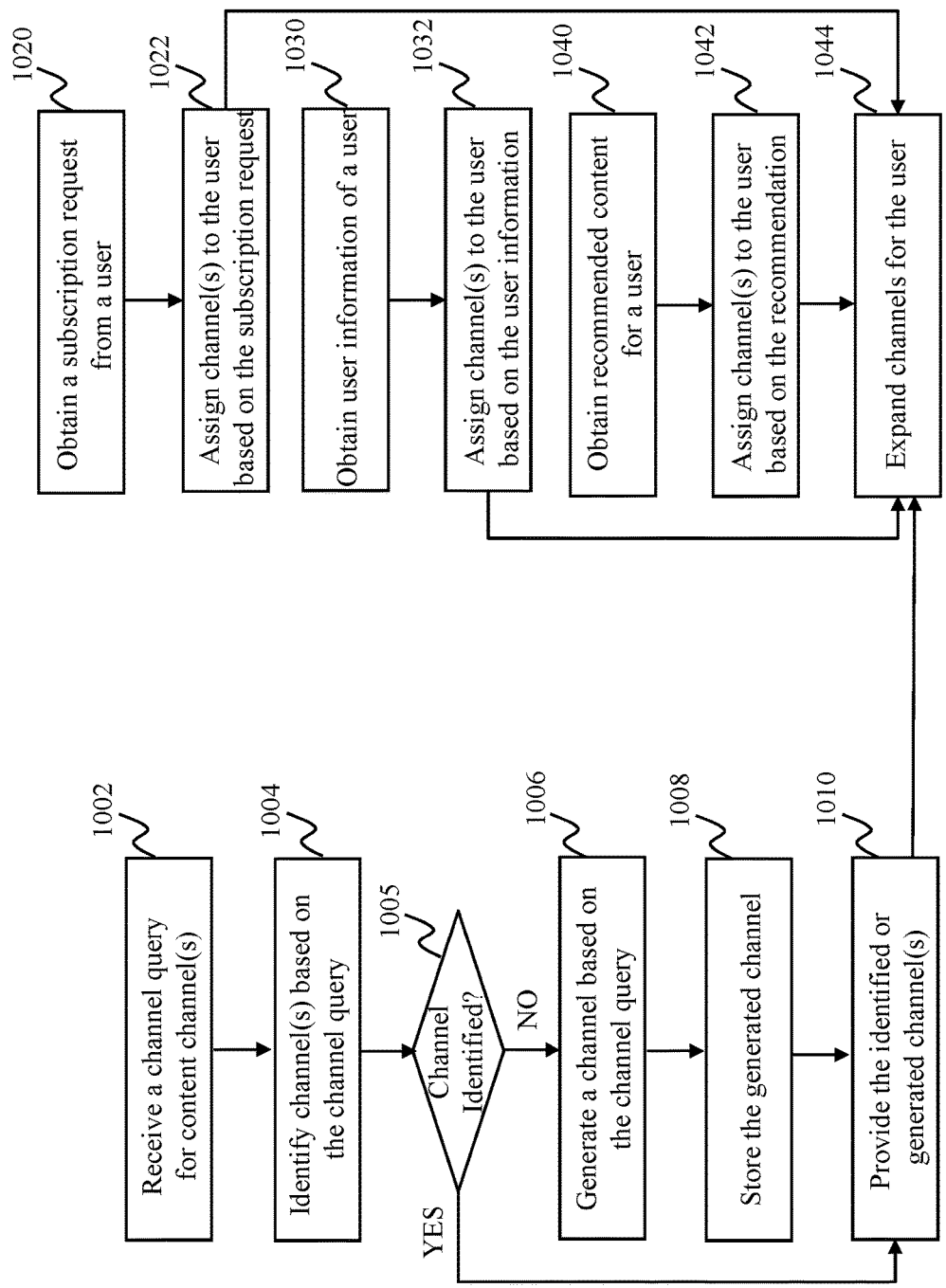
FIG. 10 is a flowchart of an exemplary process performed by an initial channel allocator, according to an embodiment of the present teaching.

FIG. 10 is a flowchart of an exemplary process performed by an initial channel allocator, according to an embodiment of the present teaching. At 1002, a channel query is received for searching content channels. The interest engine tries to identify channels at 1004 based on the channel query. If any channel is identified, at 1005, the process goes directly to 1010. If no channel is identified, at 1005, the process goes to 1006 to generate a new channel based on the search query. The generated new channel is stored at 1008. Then the process goes to 1010. At 1010, the identified or generated channels are provided for channel expansion. The process then goes on to 1044.

In one embodiment, a subscription request is obtained at 1020 from a user. One or more channels are assigned to the user at 1022 based on the subscription request. The process then moves on to 1044.

In another embodiment, user information of a user is obtained at 1030. Then at 1032, one or more channels are assigned to the user based on the user information. Then the process moves on to 1044.

In a different embodiment, recommended content for a user is obtained at 1040. One or more channels are assigned to the user based on the recommended content at 1042. Then the process goes on to 1044.

At 1044, one or more channels are expanded for the user, based on e.g. the identified channel, the generated new channel, the subscribed channel, the user information based assigned channel, and/or the recommended channel.

Figure 11:
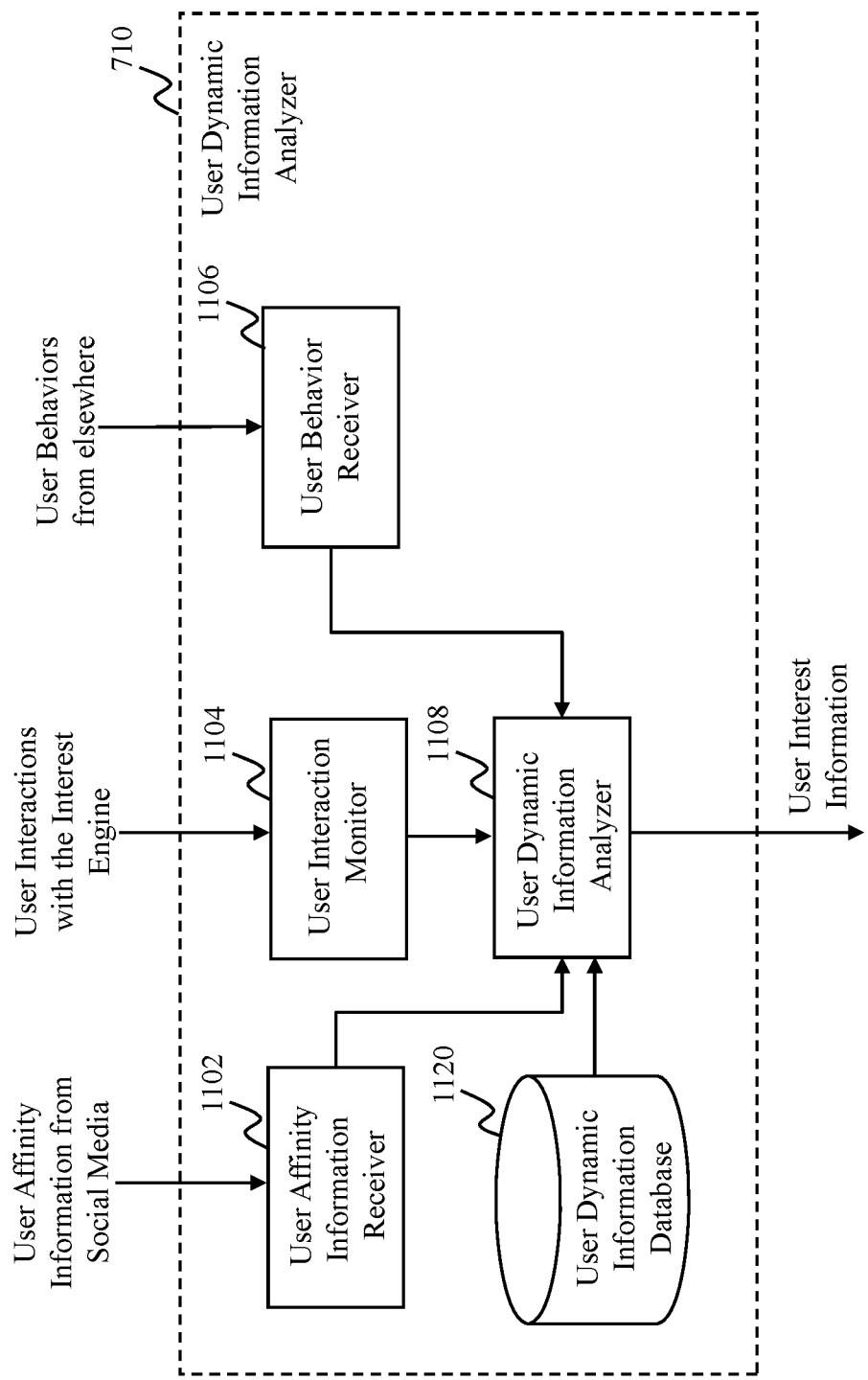
FIG. 11 illustrates an exemplary diagram of a user dynamic information analyzer, according to an embodiment of the present teaching.

FIG. 11 illustrates an exemplary diagram of a user dynamic information analyzer 710, according to an embodiment of the present teaching. In this example, the user dynamic information analyzer 710 includes a user affinity information receiver 1102, a user interaction monitor 1104, a user behavior receiver 1106, a user dynamic information analyzer 1108, and a user dynamic information database 1120.

The user affinity information receiver 1102 in this example can receive user affinity information from a social media or social network. The user affinity information may include information about how different users are connected or associated in the social media or network. The user affinity information may be used to infer a user's interest based on interests of users associated with the user. The user affinity information receiver 1102 may send the user affinity information to the user dynamic information analyzer 1108 for analysis.

The user interaction monitor 1104 in this example can monitor user interactions with the interest engine, with the interest portal, or with the app supported by the interest engine. The user interactions may include information about users' behavior on the user interface 2000 as described above. The user interactions may be used to infer a trend of a user's interest. The user interaction monitor 1104 may send the user interaction information to the user dynamic information analyzer 1108 for analysis.

The user behavior receiver 1106 in this example can receive user behavior from other online sources, e.g. other websites, other portals, or other apps. The user behavior received by the user behavior receiver 1106 may include a user's online shopping behavior, online chatting behavior, online posting behavior, etc. These online user behaviors may also be used to infer the user's interest or better understand the user's short term and long term intent. The user behavior receiver 1106 may send the user behavior information to the user dynamic information analyzer 1108 for analysis.

The user dynamic information analyzer 1108 in this example may receive all of the above described user dynamic information from the user affinity information receiver 1102, the user interaction monitor 1104 and the user behavior receiver 1106. The user dynamic information analyzer 1108 can analyze the user dynamic information associated with each user to determine user interest information for the user. The user interest information may indicate the user's short term or long term interest. This determination may be based on information from the user dynamic information database 1120. In one embodiment, the user dynamic information database 1120 may store a mapping table to map different user dynamic information to user interest information. For example, clicking on an article may be mapped to a weak interest on the topic of the article; viewing an article for a long time may be mapped to a strong interest on the topic of the article; sharing an article to a friend may be mapped to a stronger interest on the topic of the article; and requesting for more articles related to the article may be mapped to an even stronger interest on the topic of the article. Based on the user dynamic information and a mapping table, the user dynamic information analyzer 1108 may determine the user interest information for a user and send the user interest information to the interest space updater 712 for determining whether to update a personal interest space of the user.

Figure 12:
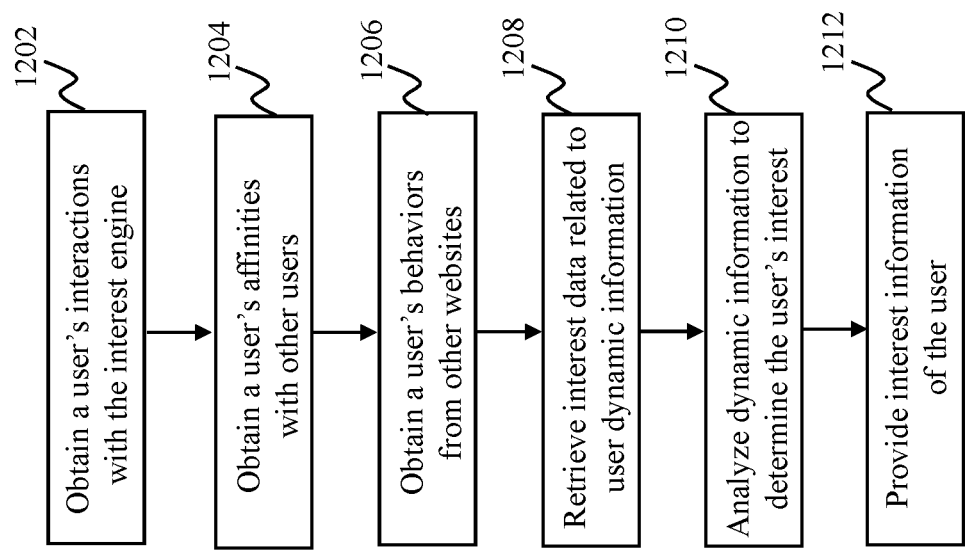
FIG. 12 is a flowchart of an exemplary process performed by a user dynamic information analyzer, according to an embodiment of the present teaching.

FIG. 12 is a flowchart of an exemplary process performed by a user dynamic information analyzer, according to an embodiment of the present teaching. At 1202, a user's interactions with the interest engine or the interest portal are obtained. A user's affinities with other users are obtained at 1204. A user's behaviors from other websites or other apps are obtained at 1206. It can be understood that the steps of 1202, 1204, and 1206 may be performed in an order different from what is shown in FIG. 12, according to other embodiments.

At 1208, interest data related to user dynamic information are retrieved, e.g. from a database. Dynamic information, including the user's interactions, affinities with other users, and behaviors elsewhere online, may be analyzed at 1210 to determine the user's interest. The interest information of the user is then provided at 1212.

Figure 13:
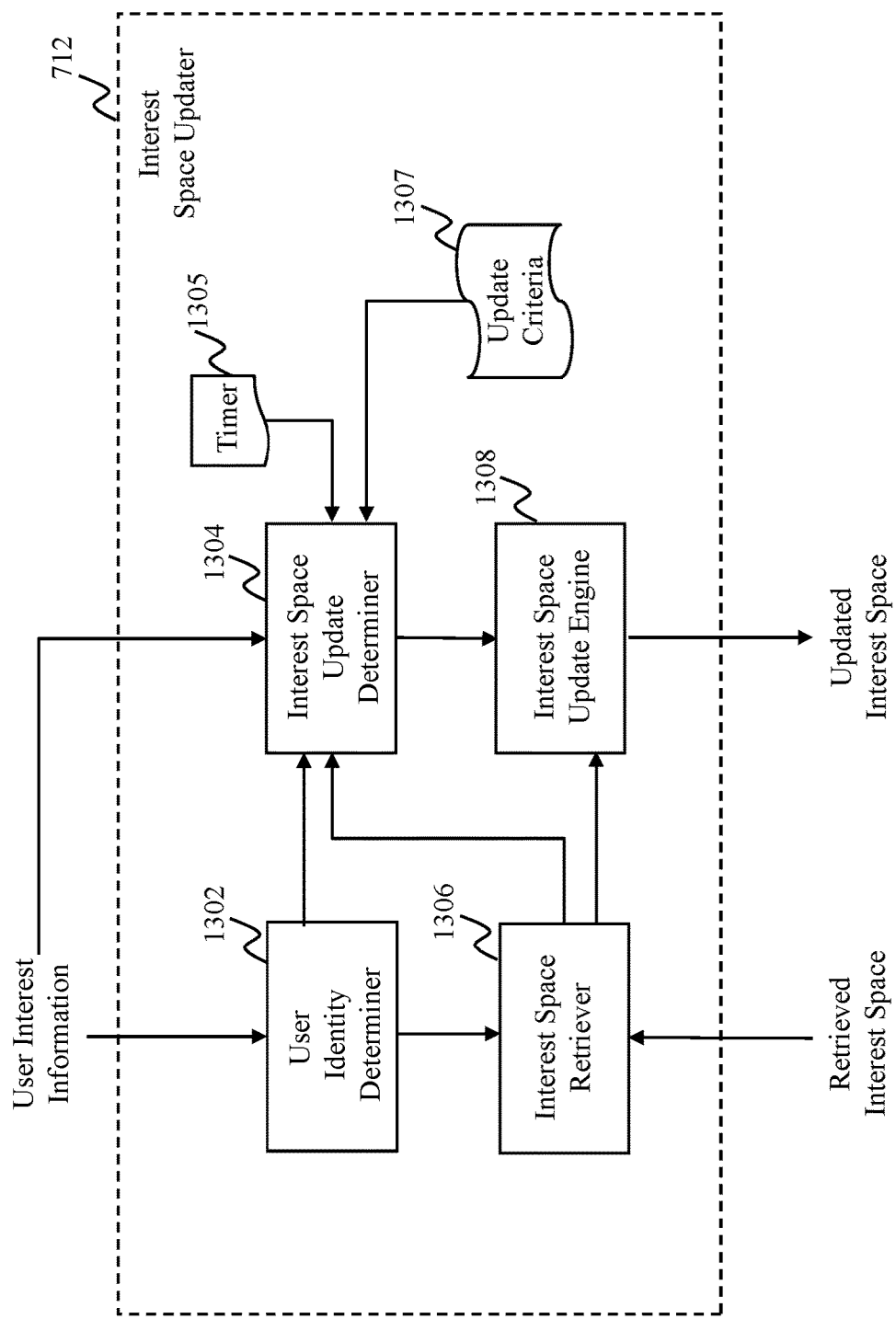
FIG. 13 illustrates an exemplary diagram of an interest space updater, according to an embodiment of the present teaching.

FIG. 13 illustrates an exemplary diagram of an interest space updater 712, according to an embodiment of the present teaching. In this example, the interest space updater 712 includes a user identity determiner 1302, an interest space update determiner 1304, an interest space retriever 1306, an interest space update engine 1308, a timer 1305, and update criteria 1307.

The user identity determiner 1302 in this example can receive user interest information from the user dynamic information analyzer 710, and determine a user identity associated with the user interest information. The user identity determiner 1302 may then send the user identity to the interest space update determiner 1304 for determining whether to update a personal interest space associated with the user identity. The user identity determiner 1302 may also send the user identity to the interest space retriever 1306 for retrieving the personal interest space associated with the user. The interest space retriever 1306 in this example may retrieve a personal interest space associated with a user from the channel based interest spaces 740, and send the retrieved personal interest space to the interest space update determiner 1304 and to the interest space update engine 1308.

The interest space update determiner 1304 in this example may receive the user interest information from the user dynamic information analyzer 710, the user identity from the user identity determiner 1302, and the retrieved personal interest space from the interest space retriever 1306. Based on the received information, the interest space update determiner 1304 can determine whether to the personal interest space associated with the user needs to be updated. This determination may be based on one of the update criteria 1307. An update criterion may specify when a personal interest space should be updated. In one example, the interest space update determiner 1304 may determine to update a personal interest space of a user when new interest not expressed in the personal interest space is discovered from the user interest information of the user. In this case, one or more new channels may need to be added to the personal interest space. In another example, the interest space update determiner 1304 may determine to update a personal interest space of a user when the user's interest changes based on the user interest information of the user, e.g. after the user indicates a dislike of some articles. In this case, one or more new channels may need to be deleted from the personal interest space. In yet another example, the interest space update determiner 1304 may take into account timing information from the timer 1305 to determine whether to update a personal interest space, e.g. to update a personal interest space if the personal interest space has not been updated for a long time, and not to update a personal interest space if the personal interest space was just updated not long ago.

If the interest space update determiner 1304 determines that a personal interest space needs to be updated, the interest space update determiner 1304 may inform the interest space update engine 1308 to perform the update. The interest space update engine 1308 in this example can receive the personal interest space from the interest space retriever 1306 and update the personal interest space according to an instruction from the interest space update determiner 1304. The interest space update engine 1308 may store the updated interest space back after the update.

Figure 14:
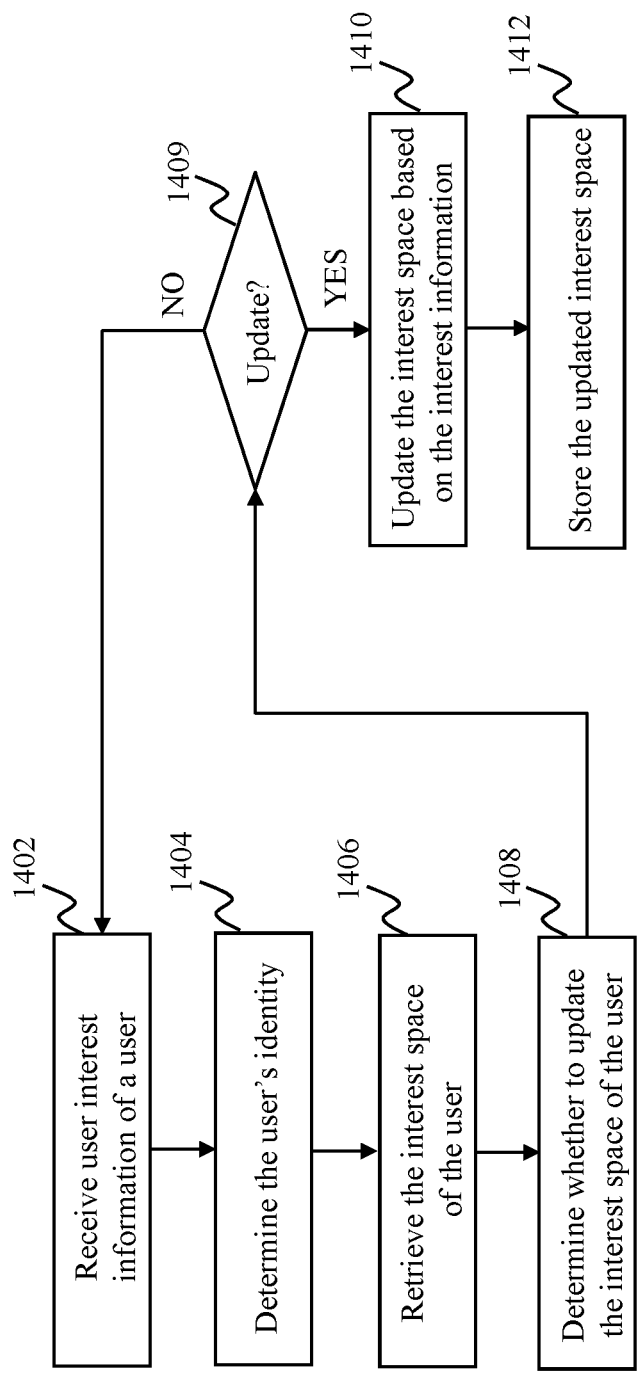
FIG. 14 is a flowchart of an exemplary process performed by an interest space updater, according to an embodiment of the present teaching.

FIG. 14 is a flowchart of an exemplary process performed by an interest space updater, according to an embodiment of the present teaching. At 1402, user interest information of a user is received. The user's identity is determined at 1404. Then at 1406, the personal interest space associated with the user is retrieved. At 1408, the interest engine determines whether to update the personal interest space. If it is determined to update the personal interest space at 1409, the process moves on to 1410. Otherwise, the process goes back to 1402. At 1410, the personal interest space is updated based on the interest information. The updated personal interest space may be stored back at 1412.

Figure 15:
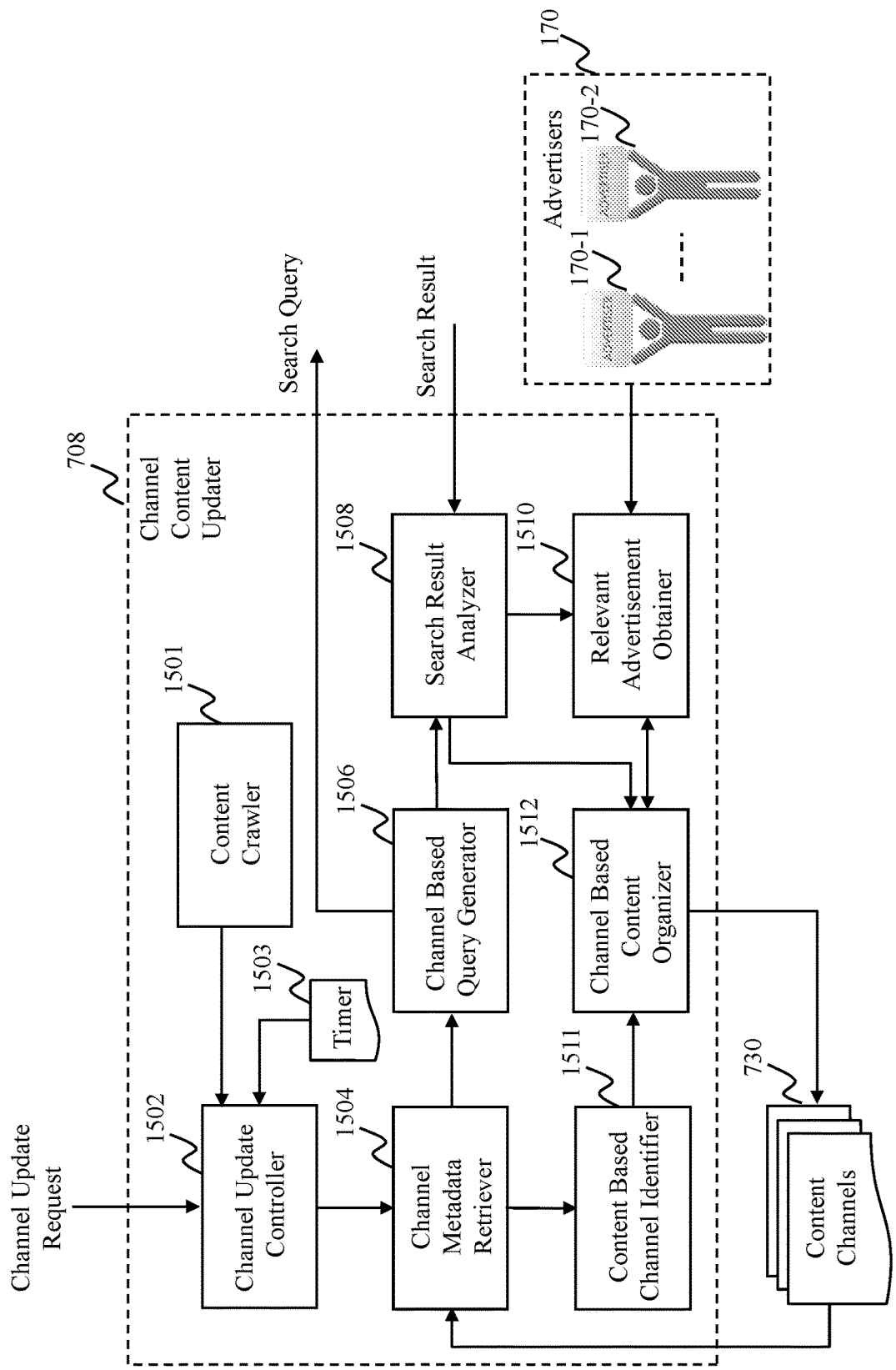
FIG. 15 illustrates an exemplary diagram of a channel content updater, according to an embodiment of the present teaching.

FIG. 15 illustrates an exemplary diagram of a channel content updater 708, according to an embodiment of the present teaching. In this example, the channel content updater 708 includes a channel update controller 1502, a content crawler 1501, a timer 1503, a channel metadata retriever 1504, a channel based query generator 1506, a search result analyzer 1508, a relevant advertisement obtainer 1510, a channel based content organizer 1512, and a content based channel identifier 1511.

The content crawler 1501 in this example can continuously obtain content from the Internet, e.g. by crawling. The content crawler 1501 may forward the obtained content to the channel update controller 1502 for controlling a channel update. The channel update controller 1502 in this example may determine whether it is time to check channels for update, e.g. based on the timer 1503 and/or based on the obtained content. For example, the channel update controller 1502 may determine to check channels for update if sufficient content has been obtained by the content crawler 1501, e.g. when the number of newly obtained content items exceeds a threshold. In another example, the channel update controller 1502 may determine to check channels for update if it has been a long time since last check, even if the number of newly obtained content items does not exceed the threshold. In one embodiment, the channel update controller 1502 may determine to check a particular channel for update, upon receiving a channel update request, from the user information/request processor 702 or from a user directly.

If the channel update controller 1502 determines to check channels for update, the channel update controller 1502 informs the channel metadata retriever 1504 to retrieve metadata of the relevant channels. The channel update controller 1502 may analyze the obtained content to determine one or more topics or categories, based on which the channel metadata retriever 1504 may retrieve metadata of channels relevant to the one or more topics from the content channels 730. The metadata may include information in the tables shown in FIG. 19. In one embodiment, the metadata of a channel may include a topic associated with the channel. The channel metadata retriever 1504 may send the metadata to the content based channel identifier 1511 for identifying channels to update.

The content based channel identifier 1511 may identify one or more channels to update based on the obtained content and metadata of channels. For example, based on an obtained content item related to New York City's basketball team, the content based channel identifier 1511 may identify channels like "sports", "basketball", "New York Knicks", and "New York City" for update. The content based channel identifier 1511 may send the identified channels to the channel based content organizer 1512 for updating content in the channels.

The channel metadata retriever 1504 may also send the metadata to the channel based query generator 1506 for generating channel based on queries. In one embodiment, the channel update controller 1502 determines to check a group of channels for update, e.g. based on a predetermined update schedule. Then the channel metadata retriever 1504 may retrieve metadata of the group of channels and send the metadata to the channel based query generator 1506.

The channel based query generator 1506 in this example may generate one or more queries for each of the group of channels, based on the topic associated with the topic. For example, the channel based query generator 1506 may generate queries "basketball", "NBA", "NCAA", "all-star", "Kobe Bryant", and "Michael Jordan" for the channel "basketball". For example, the channel based query generator 1506 may generate queries "mental health", "heart health", "men's health", "women's health", "fitness", "diet", "exercise" and "health insurance" for the channel "health". The channel based query generator 1506 may send the generated queries to the search/recommendation engine 150 for searching content online related to the queries.

The search result analyzer 1508 may receive the search result from the search/recommendation engine 150 about the generated queries, and analyze the search result to determine searched content that can be used to update corresponding channels. For example, the search result analyzer 1508 may filter out content items generated one day ago from the search result, if the search result analyzer 1508 has provided these content items for update within the day. The search result analyzer 1508 may send the searched content or filtered content items to the relevant advertisement obtainer 1510 for obtaining relevant advertisements. The search result analyzer 1508 may also send the searched content to the channel based content organizer 1512 for updating corresponding channels.

The relevant advertisement obtainer 1510 in this example may obtain advertisements from the advertisers 170, based on the searched content received from the search result analyzer 1508. For example, the relevant advertisement obtainer 1510 may obtain an advertisement on a Yoga class, to be presented with an article in the search result about Yoga. In one embodiment, the relevant advertisement obtainer 1510 may obtain advertisements based on a bidding process with respect to the advertisers 170. In another embodiment, the relevant advertisement obtainer 1510 may receive a request from the channel based content organizer 1512 to obtain advertisements relevant to a channel identified by the content based channel identifier 1511. For example, the relevant advertisement obtainer 1510 may obtain advertisements on tennis racquets to be presented with content items in the channel "tennis".

The channel based content organizer 1512 may update a channel identified by the content based channel identifier 1511 with corresponding crawled content from the Internet or update a channel whose associated query has been generated and submitted to get a search result at the search result analyzer 1508. In one example, the channel based content organizer 1512 may receive identified channels from the content based channel identifier 1511 and content items based on which the channels are identified. The channel based content organizer 1512 may ask the relevant advertisement obtainer 1510 for advertisements relevant to the content items. Then, the channel based content organizer 1512 may organize the content items and the relevant advertisements into the identified channels to update these channels. The channel based content organizer 1512 may store the updated channels with the updated content and advertisements.

In another example, the channel based content organizer 1512 may receive searched content items based on some queries from the search result analyzer 1508, corresponding channels based on which the queries were generated from the content based channel identifier 1511, and advertisements relevant to the channels from the relevant advertisement obtainer 1510. Then, the channel based content organizer 1512 may organize the searched content items and the relevant advertisements into the corresponding channels to update these channels. The channel based content organizer 1512 may store the updated channels with the updated content and advertisements.

Figure 16:
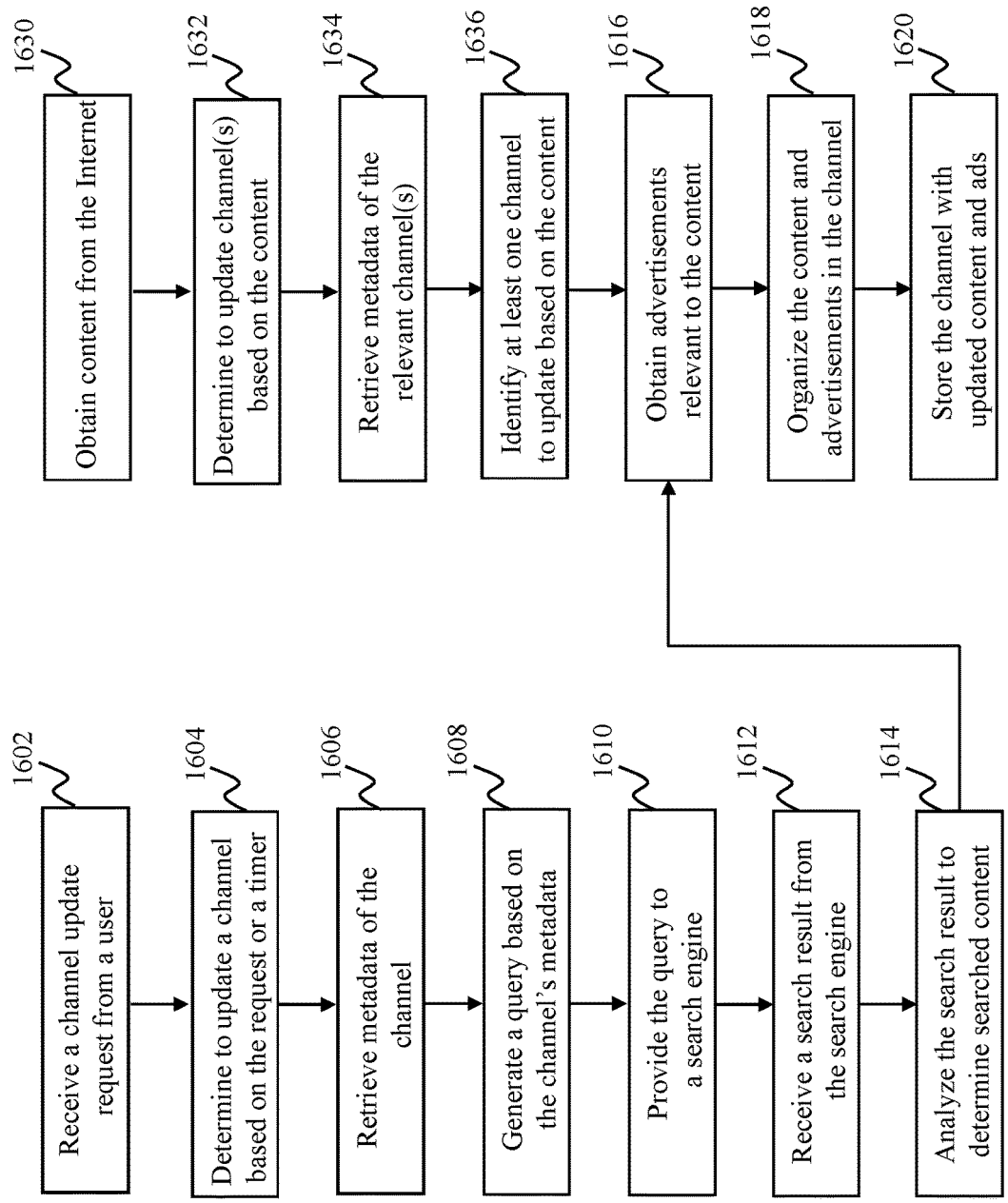
FIG. 16 is a flowchart of an exemplary process performed by a channel content updater, according to an embodiment of the present teaching.

FIG. 16 is a flowchart of an exemplary process performed by a channel content updater, according to an embodiment of the present teaching. At 1602, a channel update request is received from a user. The interest engine may determine to update a channel based on the request or a timer at 1604. Metadata of the channel is retrieved at 1606. At 1608, a query is generated based on the channel's metadata. The query is then provided at 1610 to a search engine for searching new content online. At 1612, a search result with respect to the query is received from the search engine. The search result is analyzed at 1614 to determine searched content items for updating the channel. The process then goes to 1616.

In one embodiment, online content is obtained, e.g. by crawling, from the Internet at 1630. The interest engine determines at 1632 to update some channel based on the obtained content. At 1634, metadata of the channel is retrieved. At least one channel is identified to be updated based on the obtained content. The process then goes to 1616.

Advertisements relevant to the obtained content or the channel are obtained at 1616. Then at 1618, the content items and the advertisements are organized into the channel to update the channel. At 1620, the channel is stored with the updated content items and the relevant advertisements, such that the interest engine may provide updated content and advertisements to subscribed users through the channel.

Figure 17:
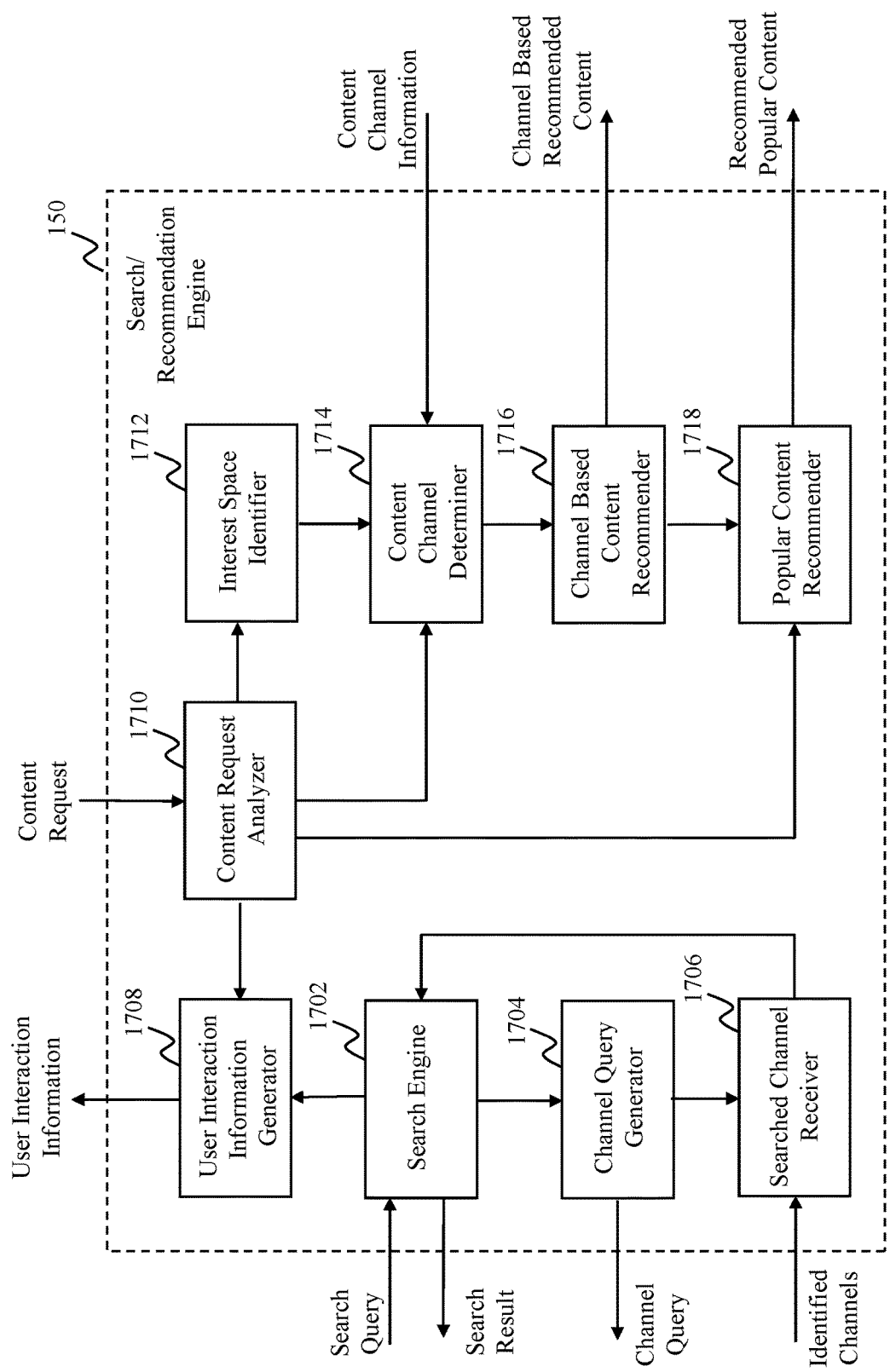
FIG. 17 illustrates an exemplary diagram of a search/recommendation engine, according to an embodiment of the present teaching.

FIG. 17 illustrates an exemplary diagram of a search/recommendation engine 150, according to an embodiment of the present teaching. In this example, the search/recommendation engine 150 includes a search engine 1702, a channel query generator 1704, a searched channel receiver 1706, a user interaction information generator 1708, a content request analyzer 1710, an interest space identifier 1712, a content channel determiner 1714, a channel based content recommender 1716, and a popular content recommender 1718.

The search engine 1702 in this example may receive a search query from a user or the interest engine. When the search query is from the interest engine, the search engine 1702 may search for online content items matching the query and send the search result to the interest engine. When the search query is from the user, the search engine 1702 may first search for online content items matching the query. In addition to that, the search engine 1702 may send the query to the channel query generator 1704 to generate a channel query.

The channel query generator 1704 may generate and send the channel query to the interest engine to identify channels matching the channel query. The channel query may or may not be the same as the search query. The searched channel receiver 1706 in this example may receive the identified channels from the interest engine and forward them to the search engine 1702 to generate the search result. In this case, the search engine 1702 may generate a search result that includes both content items matching the search query and identified channels matching the channel query. The search engine 1702 can provide this hybrid search result to the user.

The search engine 1702 may also send information about the search query and search result to the user interaction information generator 1708 for generating user interaction information. The user interaction information generator 1708 may generate and send user interaction information to the interest engine for updating channels and/or personal interest spaces. In one embodiment, the user interaction information generator 1708 may generate the user interaction information based on a user's interaction with the search engine 1702. In another embodiment, the user interaction information generator 1708 may also generate the user interaction information based on a content request from the user, forwarded by the content request analyzer 1710.

The content request analyzer 1710 in this example may receive a content request from a user or from the interest engine. In one example, the user may send the content request regarding content items in a channel, e.g. by clicking on one of the channel buttons 2020 in FIG. 20. In another example, the interest engine may send the content request regarding channels associated with a user once the user logs in at the interest portal or the app supported by the interest engine. The content request analyzer 1710 may analyze the content request to identify the user and send the content request to the interest space identifier 1712, the content channel determiner 1714, the popular content recommender 1718, and the user interaction information generator 1708.

The interest space identifier 1712 may identify the personal interest space of the user and inform the content channel determiner 1714. The content channel determiner 1714 may determine one or more channels within this user's personal interest space, based on the content request. In one embodiment, the content request is with respect to a channel that is not yet in the user's personal interest space. In that case, the content channel determiner 1714 can still determine the channel and instruct the channel based content recommender 1716 to provide content items in the channel to the user.

The channel based content recommender 1716 may provide organized content within the determined channels to the user who sends or triggers the content request. In one embodiment, the content request is regarding popular content among all users. Then the popular content recommender 1718 may identify the popular content and provide them to the user. In another embodiment, even if the content request is regarding a channel subscribed by the user, the popular content recommender 1718 may still recommend some popular content to the user, in addition to the channel based content provided by the channel based content recommender 1716.

It can be understood that according to some embodiments, the components in the search/recommendation engine 150 may be implemented within the interest engine 140 instead.

Figure 18:
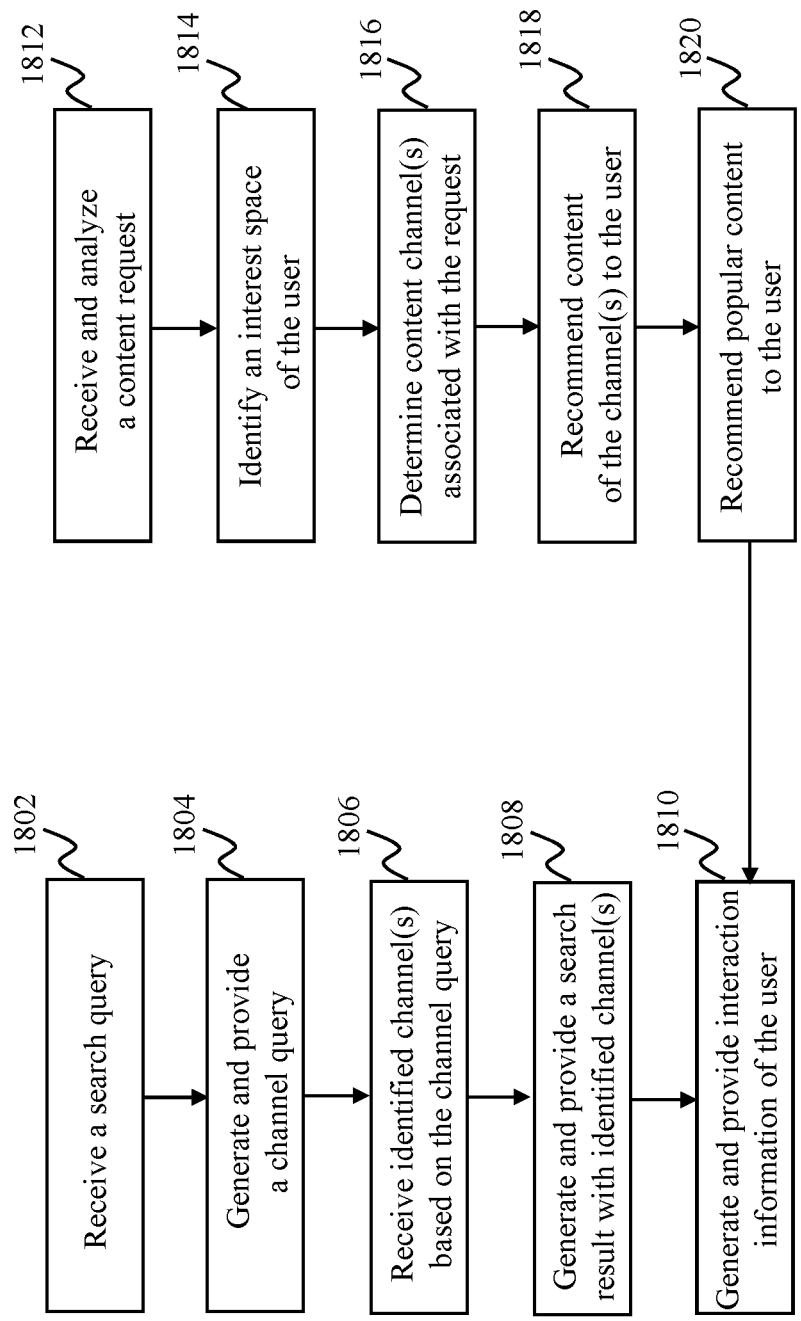
FIG. 18 is a flowchart of an exemplary process performed by a search/recommendation engine, according to an embodiment of the present teaching.

FIG. 18 is a flowchart of an exemplary process performed by a search/recommendation engine, according to an embodiment of the present teaching. At 1802, a search query is received. A channel query is generated and provided at 1804. Identified channels based on the channel query are received at 1806. At 1808, a search result is generated and provided with the identified channels. The process then moves on to 1810.

In one embodiment, a content request associated with a user is received and analyzed at 1812. A personal interest space associated with the user is identified at 1814. At 1816, content channels are determined based on the personal interest space and the request. At 1818, content items within the determined channels are provided or recommended to the user. Popular content items may also be recommended to the user at 1820. Then the process moves on to 1810.

At 1810, user interaction information of the user is generated and provided, e.g. to the interest engine for updating a personal interest space of the user.

Figure 21:
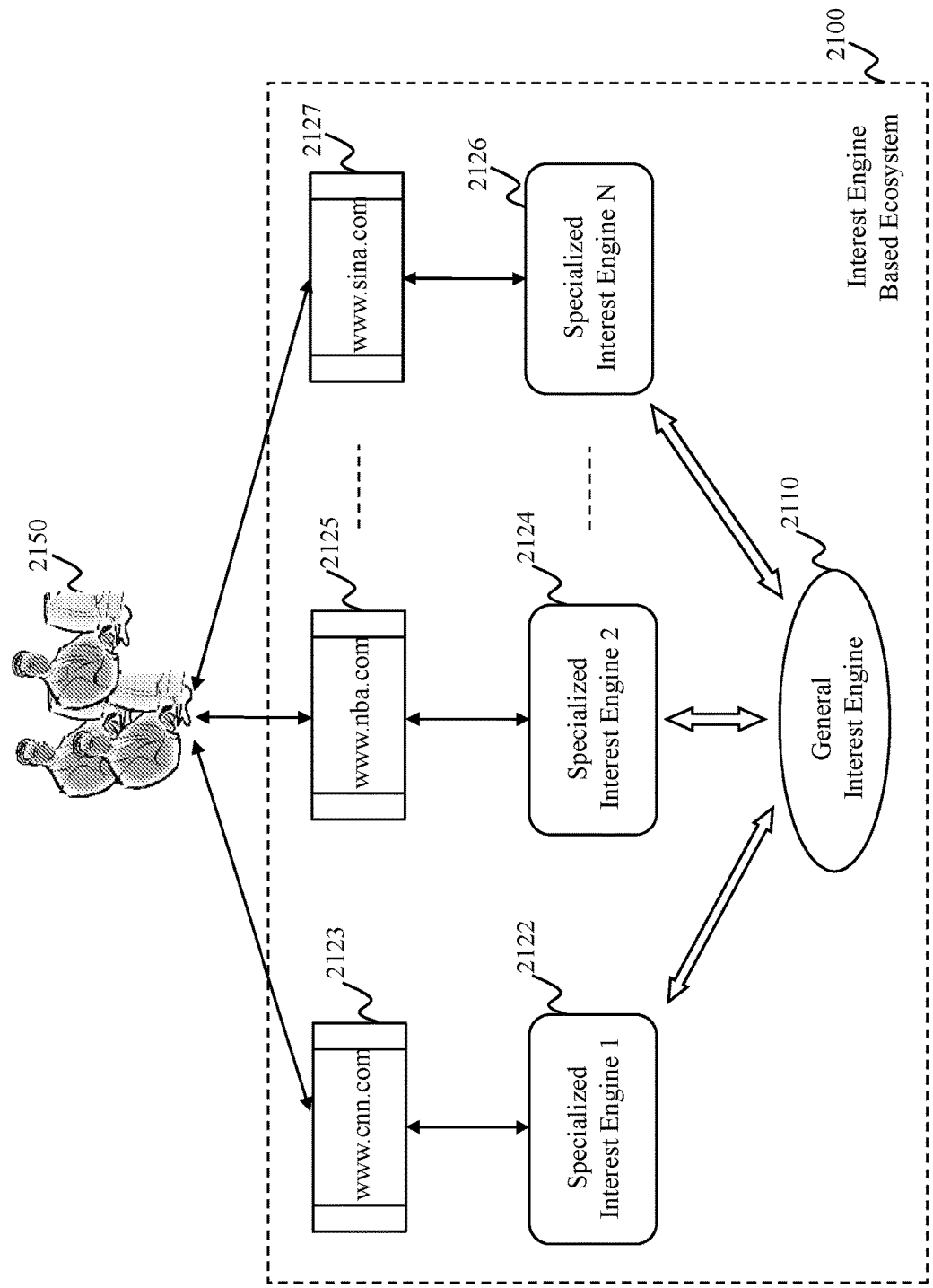
FIG. 21 illustrates an interest engine based ecosystem, according to an embodiment of the present teaching.

FIG. 21 illustrates an interest engine based ecosystem 2100, according to an embodiment of the present teaching. As shown in FIG. 21, the interest engine based ecosystem 2100 may include a general interest engine 2110, and one or more specialized interest engines 2122, 2124, 2126, each of which is associated with a specialized interest portal 2123, 2125, 2127. The general interest engine 2110 may provide an open platform based on which any publisher or content provider can easily create its own specialized interest engine. The content provider may fully control its own specialized interest engine. In general, the general interest engine 2110 may provide any technical support for the specialized interest engines. In another example, the owner of the general interest engine 2110 may license the general interest engine 2110 to different content providers as a service, such that each content provider having the license can obtain a copy of the general interest engine 2110 and use it as a specialized interest engine to provide content to users.

In one embodiment, the general interest engine 2110 may include a same structure as the interest engine 140 disclosed above. The general interest engine 2110 may organize any content online. A specialized interest engine may have a same or similar structure as the interest engine 140 disclosed above. In contrast to the general interest engine 2110, the specialized interest engine may organize content published by a specific publisher. For example, the specialized interest engine 1 2122 organizes content published by www.cnn.com 2123; the specialized interest engine 2 2124 organizes content published by www.nba.com 2125; and the specialized interest engine N 2126 organizes content published by www.sina.com 2127. Each of the users 2150 may interact with one or more of the publishers 2123, 2125, 2127. For example, a user may download an app on his smartphone to view content from www.nba.com, through channels supported by the specialized interest engine 2 2124.

A specialized interest engine may be generated based on the general interest engine. An entity or publisher may build up a specialized interest engine quickly based on a general interest engine, e.g. based on an SDK in connection with the general interest engine, without a need to construct from scratch. As shown in FIG. 21, different entities or publishers are associated with different specialized interest engines that are all connected to the general interest engine 2110, which forms the interest engine based ecosystem 2100. In this interest engine based ecosystem 2100, the general interest engine 2110 may coordinate different specialized interest engines to maximize overall traffic of the ecosystem without overwriting the benefit brought by a specialized interest engine to the associated publisher. For example, after a user views many content items in channel "basketball" on an app associated with www.cnn.com 2123, the user may intend to leave www.cnn.com 2123. In this case, the specialized interest engine 1 2122 may provide content items from www.nba.com 2125 to keep the user, e.g. by creating a special channel to import the content items from www.nba.com 2125. For example, the specialized interest engine 1 2122 may obtain these content items via the general interest engine 2110, which has access to all content items from all of the publishers in the interest engine based ecosystem 2100.

In one embodiment, after a user views many content items in channel "basketball" on an app associated with www.cnn.com 2123, the specialized interest engine 1 2122 may provide a recommended app associated with www.nba.com 2125 to the user, such that the user can install the recommended app to receive more basketball related content items organized in channels. In another embodiment, after a user views many content items in channel "basketball" on an app associated with www.cnn.com 2123, the specialized interest engine 1 2122 may direct the user to the specialized interest engine 2 2124 or direct the user to the website of www.nba.com 2125, such that the user's traffic is driven to another content provider www.nba.com 2125. In another embodiment, www.nba.com 2125 may also use content from www.cnn.com 2123 to keep users. This kind of traffic re-direction or re-driven may help to maximize the overall traffic within the interest engine based ecosystem 2100.

In one example, one publisher may import a personal interest space of a user from another publisher, via the general interest engine 2110 which may serve as an interest engine coordinator. In another example, one publisher may export a personal interest space of a user to another publisher, via the general interest engine 2110.

In one embodiment, a specialized interest engine's channels are provided by the general interest engine 2110. In another embodiment, a specialized interest engine may also create a channel that is not in the general interest engine 2110.

Figure 22:
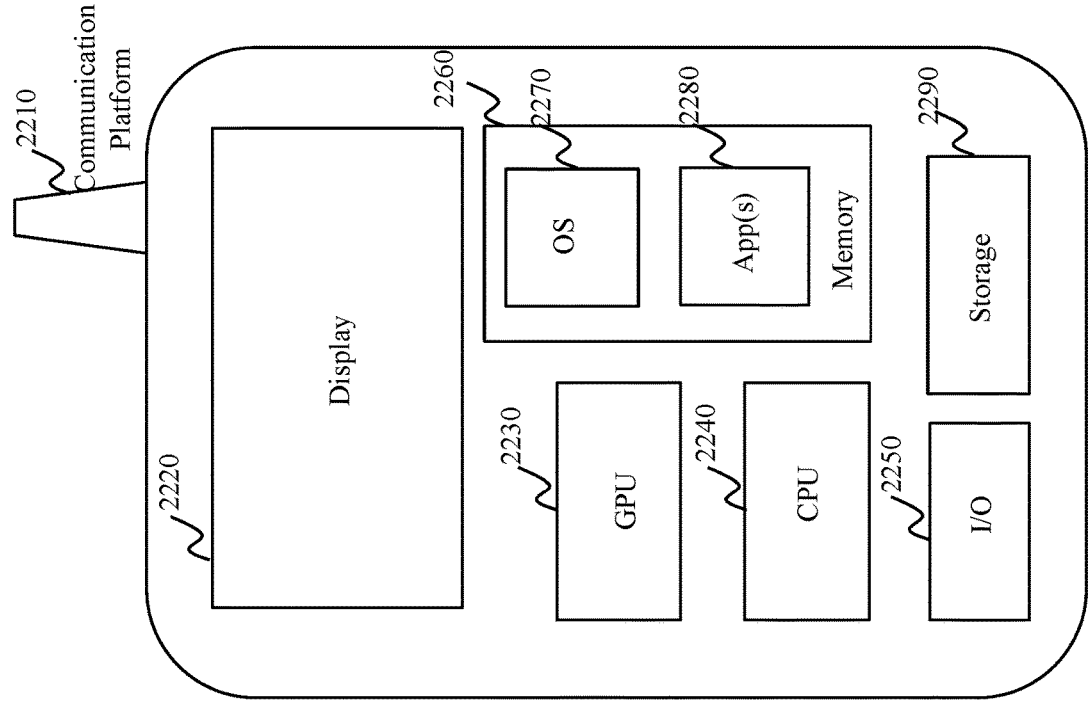
FIG. 22 depicts the architecture of a mobile device which can be used to implement a specialized system incorporating the present teaching.

FIG. 22 depicts the architecture of a mobile device which can be used to realize a specialized system implementing the present teaching. In this example, the user device on which organized content items are presented and interacted-with is a mobile device 2200, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 2200 in this example includes one or more central processing units (CPUs) 2240, one or more graphic processing units (GPUs) 2230, a display 2220, a memory 2260, a communication platform 2210, such as a wireless communication module, storage 2290, and one or more input/output (I/O) devices 2250. Any other suitable component, including but not limited to a system bus or a controller (not shown), may also be included in the mobile device 2200. As shown in FIG. 22, a mobile operating system 2270, e.g., iOS, Android, Windows Phone, etc., and one or more applications 2280 may be loaded into the memory 2260 from the storage 2290 in order to be executed by the CPU 2240. The applications 2280 may include a browser or any other suitable mobile apps for receiving organized content items through channels on the mobile device 2200. User interactions with the organized content items may be achieved via the I/O devices 2250 and provided to the interest engine 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the interest engine 140 and/or other components of systems 100 and 100 described with respect to FIGS. 1-20). The hardware elements, operating systems and programming languages of such computers are conventional in nature, and it is presumed that those skilled in the art are adequately familiar therewith to adapt those technologies to selecting and providing an advertisement to a user as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 23:
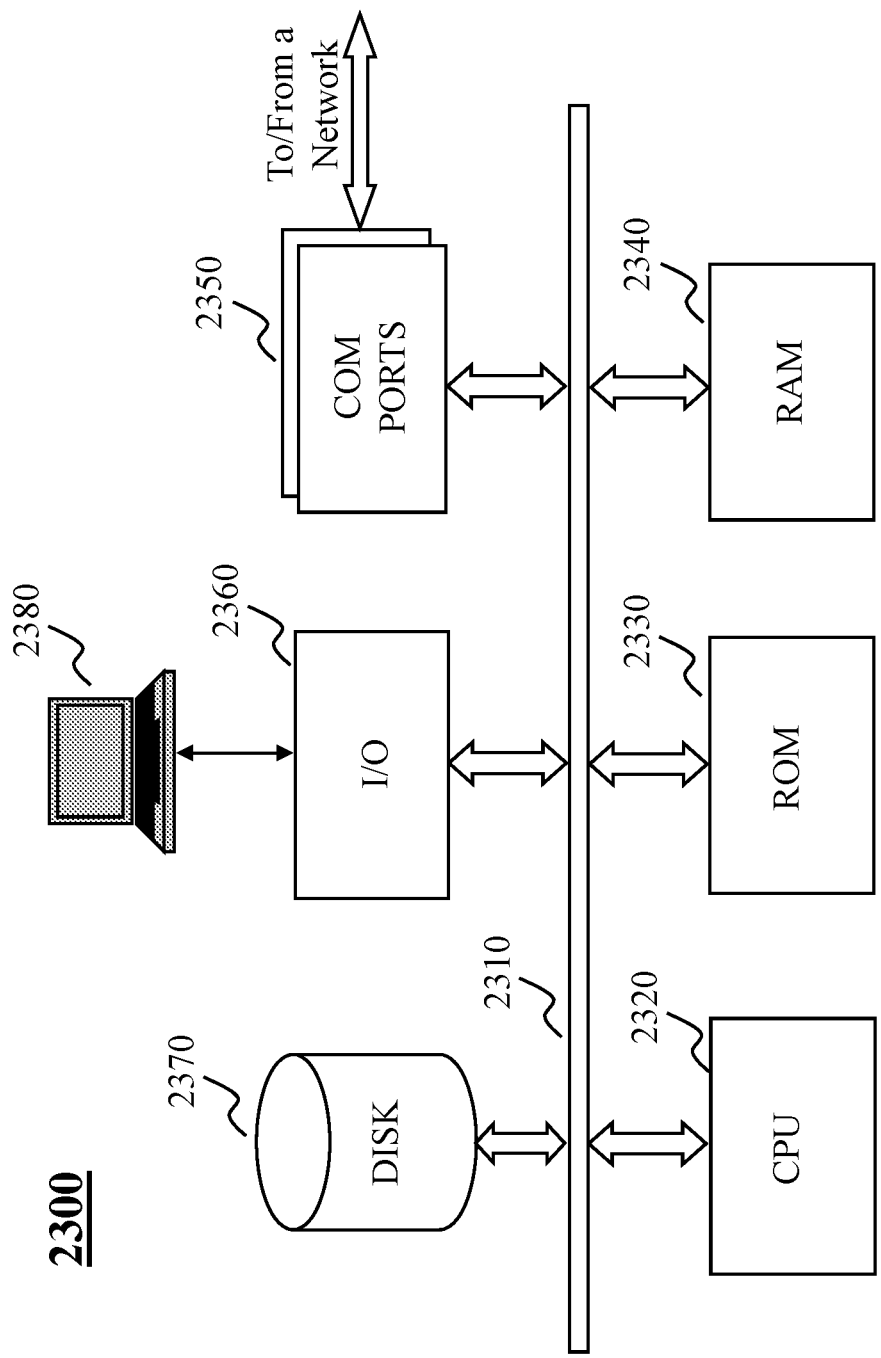
FIG. 23 depicts the architecture of a computer which can be used to implement a specialized system incorporating the present teaching.

FIG. 23 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 2300 may be used to implement any component of the providing organized content techniques, as described herein. For example, the interest engine 140, etc., may be implemented on a computer such as computer 2300, via its hardware, software program, firmware, or a combination thereof. Although only one such computer is shown, for convenience, the computer functions relating to providing organized content as described herein may be implemented in a distributed fashion on a number of similar platforms, to distribute the processing load.

The computer 2300, for example, includes COM ports 2350 connected to and from a network connected thereto to facilitate data communications. The computer 2300 also includes a central processing unit (CPU) 2320, in the form of one or more processors, for executing program instructions. The exemplary computer platform includes an internal communication bus 2310, program storage and data storage of different forms, e.g., disk 2370, read only memory (ROM) 2330, or random access memory (RAM) 2340, for various data files to be processed and/or communicated by the computer, as well as possibly program instructions to be executed by the CPU. The computer 2300 also includes an I/O component 2360, supporting input/output flows between the computer and other components therein such as user interface elements 2380. The computer 2300 may also receive programming and data via network communications.

Hence, aspects of the methods of providing organized content, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a DSP into the hardware platform(s) of a computing environment or other system implementing a computing environment or similar functionalities in connection with providing organized content. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the providing organized content as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, implemented on a machine having at least one processor, storage, and a communication platform connected to a network for providing content to a user, the method comprising:
   obtaining information related to a user;
   determining one or more channels for the user from a plurality of channels based on the information, wherein each of the plurality of channels includes one or more online content items;
   establishing a personal interest space associated with the user based on the information related to the user and the one or more channels;

obtaining dynamic information associated with the user, wherein the dynamic information includes at least information related to interactions of the user with online content;

updating the personal interest space based on the dynamic information; and providing content in the one or more channels to the user based on the updated personal interest space.

2. The method of claim 1, wherein the one or more online content items included in each channel are related to a common topic or have a common feature.

3. The method of claim 1, further comprising:

determining one or more sub-channels within each of the one or more channels based on the information related to the user; and determining content to be provided to the user in accordance with the one or more sub-channels.

4. The method of claim 1, wherein the information related to the user comprises at least one of the following:

the user's demographic information;

information about the user's online behavior; information about the user's interest; and the user's selection of one or more channels.

5. The method of claim 1, wherein the step of updating further comprises:

adding a channel to the personal interest space associated with the user based on the dynamic information.

6. The method of claim 5, wherein the channel is generated based on the dynamic information and different from any of the plurality of channels.

7. The method of claim 1, wherein the dynamic information comprises information about at least one of the following:

the user's interaction with respect to the machine;

the user's online behavior obtained from a website; and the user's social relationship with other users.

8. The method of claim 7, wherein the user's interaction comprises at least one of the following:

submitting a search query for online content;

submitting a search query for a channel;

submitting a subscription request with respect to a channel;

submitting an un-subscription request with respect to a channel; and the user's click behavior with respect to organized content provided to the user.

9. The method of claim 1, further comprising:

randomly selecting a channel from the plurality of channels, wherein the channel is different from the one or more channels; and adding the channel to the personal interest space associated with the user.

10. The method of claim 1, further comprising:

updating content in a channel in the personal interest space associated with the user based on the dynamic information.

11. The method of claim 1, further comprising:

determining an expanded channel based on at least one of the one or more channels; and adding the expanded channel to the personal interest space associated with the user.

12. A system having at least one processor, storage, and a communication platform connected to a network for providing content to a user, comprising:

a user information processor configured for obtaining information related to a user;

an initial channel allocator configured for determining one or more channels for the user from a plurality of channels based on the information, wherein each of the plurality of channels includes one or more online content items;

an initial interest space generator configured for establishing a personal interest space associated with the user based on the information related to the user and the one or more channels;

a user dynamic information analyzer configured for obtaining dynamic information associated with the user, wherein the dynamic information includes at least information related to interactions of the user with online content;

an interest space updater configured for updating the personal interest space based on the dynamic information; and a channel based content recommender configured for providing content in the one or more channels to the user based on the updated personal interest space.

13. The system of claim 12, wherein the one or more online content items included in each channel are related to a common topic or have a common feature.

14. The system of claim 12, wherein the information related to the user comprises at least one of the following:

the user's demographic information;

information about the user's online behavior; information about the user's interest; and the user's selection of one or more channels.

15. The system of claim 12, wherein the interest space updater is further configured for:

adding a channel to the personal interest space associated with the user based on the dynamic information.

16. The system of claim 15, wherein the channel is generated based on the dynamic information and different from any of the plurality of channels.

17. The system of claim 12, wherein the dynamic information comprises information about at least one of the following:

the user's interaction with respect to the machine;

the user's online behavior obtained from a website; and the user's social relationship with other users.

18. The system of claim 12, further comprising:

a channel content updater configured for updating content in a channel in the personal interest space associated with the user based on the dynamic information.

19. The system of claim 12, further comprising a channel expansion engine configured for:

determining an expanded channel based on at least one of the one or more channels; and adding the expanded channel to the personal interest space associated with the user.

20. A machine-readable, non-transitory and tangible medium having information recorded thereon for providing content to a user, the information, when read by the machine, causes the machine to perform the following:

obtaining information related to a user;

determining one or more channels for the user from a plurality of channels based on the information, wherein each of the plurality of channels includes one or more online content items;

establishing a personal interest space associated with the user based on the information related to the user and the one or more channels;

obtaining dynamic information associated with the user, wherein the dynamic information includes at least information related to interactions of the user with online content;

updating the personal interest space based on the dynamic information; and providing content in the one or more channels to the user based on the updated personal interest space.

21. The medium of claim 20, wherein the one or more online content items included in each channel are related to a common topic or have a common feature.

22. The medium of claim 20, wherein the information, when read by the machine, further causes the machine to perform the following:

determining one or more sub-channels within each of the one or more channels based on the information related to the user; and determining content to be provided to the user in accordance with the one or more sub-channels.

23. The medium of claim 20, wherein the information related to the user comprises at least one of the following:

the user's demographic information;
information about the user's online behavior;
information about the user's interest; and
the user's selection of one or more channels.

24. The medium of claim 20, wherein the information, when read by the machine, further causes the machine to perform the following:

adding a channel to the personal interest space associated with the user based on the dynamic information.

25. The medium of claim 24, wherein the channel is generated based on the dynamic information and different from any of the plurality of channels.

26. The medium of claim 20, wherein the dynamic information comprises information about at least one of the following:

the user's interaction with respect to the machine;
the user's online behavior obtained from a website; and
the user's social relationship with other users.

27. The medium of claim 20, wherein the information, when read by the machine, further causes the machine to perform the following:

updating content in a channel in the personal interest space associated with the user based on the dynamic information.

28. The medium of claim 20, wherein the information, when read by the machine, further causes the machine to perform the following:

determining an expanded channel based on at least one of the one or more channels; and adding the expanded channel to the personal interest space associated with the user.

* * * * *